United States Patent
Song et al.

(10) Patent No.: US 9,374,679 B2
(45) Date of Patent: Jun. 21, 2016

(54) SERVICE PROVIDING DEVICE, SERVICE PROVIDING SYSTEM INCLUDING USER PROFILE SERVER, AND SERVICE PROVIDING METHOD FOR SERVICE PROVIDING DEVICE

(71) Applicant: SAMSUNG ELECTRONICS CO., LTD., Suwon-si (KR)

(72) Inventors: Sang-gon Song, Suwon-si (KR); Yeo-jin Kim, Suwon-si (KR); Il-ku Chang, Seongnam-si (KR); Young-ho Rhee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/407,309

(22) PCT Filed: Jun. 11, 2013

(86) PCT No.: PCT/KR2013/005132
§ 371 (c)(1),
(2) Date: Dec. 11, 2014

(87) PCT Pub. No.: WO2013/187666
PCT Pub. Date: Dec. 19, 2013

(65) Prior Publication Data
US 2015/0133164 A1    May 14, 2015

Related U.S. Application Data

(60) Provisional application No. 61/658,095, filed on Jun. 11, 2012.

(30) Foreign Application Priority Data

Dec. 11, 2012  (KR) .................. 10-2012-0143705
Jan. 18, 2013  (KR) .................. 10-2013-0006105
Jun. 11, 2013  (KR) .................. 10-2013-0066380

(51) Int. Cl.
*H04W 24/00*    (2009.01)
*H04W 4/04*    (2009.01)
(Continued)

(52) U.S. Cl.
CPC .............. *H04W 4/046* (2013.01); *B60W 50/00* (2013.01); *B60W 50/08* (2013.01); *B60W 50/14* (2013.01);
(Continued)

(58) Field of Classification Search
CPC ...... H04W 4/046; H04L 67/22; B60W 50/00; B60W 50/08; B60W 50/14; G01C 21/34; G06Q 10/10; G06Q 50/10; G06Q 50/30
USPC ....................................................... 455/456.3
See application file for complete search history.

(56) References Cited

U.S. PATENT DOCUMENTS 5,819,198 A * 10/1998 Peretz ........................... 701/117
6,246,948 B1 * 6/2001 Thakker ......................... 701/93
(Continued)

FOREIGN PATENT DOCUMENTS

JP    2007-122579 A    5/2007
JP    2010-531515 A    9/2010
(Continued)

OTHER PUBLICATIONS

International Search Report (PCT/ISA/210) dated Oct. 18, 2013, issued in International Application No. PCT/KR2013/005132.
(Continued)

*Primary Examiner* — Juan A Torres
(74) *Attorney, Agent, or Firm* — Sughrue Mion, PLLC

(57) ABSTRACT

A service providing device is disclosed. The service providing device mounted in a vehicle comprises: a communication unit for receiving a terminal signal from at least one terminal device; and a control unit which determines the distance to the terminal device from the received terminal signal, determines a user riding in the vehicle on the basis of the determined distance, and provides a preset service on the basis of the determined user and terminal information included in the terminal signal. Thus, the service providing device can provide a service suitable for the user riding in the vehicle.

20 Claims, 14 Drawing Sheets

(51) Int. Cl.

| | | |
|---|---|---|
| *G06Q 10/10* | (2012.01) | |
| *G06Q 50/10* | (2012.01) | |
| *G06Q 50/30* | (2012.01) | |
| *B60W 50/08* | (2012.01) | |
| *B60W 50/14* | (2012.01) | |
| *B60W 50/00* | (2006.01) | |
| *G01C 21/34* | (2006.01) | |
| *H04L 29/08* | (2006.01) | |

(52) U.S. Cl.
CPC ............... *G01C 21/34* (2013.01); *G06Q 10/10* (2013.01); *G06Q 50/10* (2013.01); *G06Q 50/30* (2013.01); *H04L 67/22* (2013.01)

(56) References Cited

U.S. PATENT DOCUMENTS

| | | | |
|---|---|---|---|
| 6,810,323 | B1 | 10/2004 | Bullock et al. |
| 8,090,367 | B2 | 1/2012 | Kameyama |
| 8,145,417 | B1 | 3/2012 | Chitre et al. |
| 8,352,178 | B2 | 1/2013 | Allen et al. |
| 8,411,830 | B2 | 4/2013 | Gilbert et al. |
| 2002/0019703 | A1* | 2/2002 | Levine ........................ 701/301 |
| 2002/0111725 | A1* | 8/2002 | Burge ........................... 701/29 |
| 2003/0016636 | A1* | 1/2003 | Tari et al. ..................... 370/328 |
| 2004/0225712 | A1 | 11/2004 | Tajima et al. |
| 2007/0271367 | A1 | 11/2007 | Yardeni et al. |
| 2008/0120175 | A1* | 5/2008 | Doering ....................... 705/14 |
| 2008/0221753 | A1 | 9/2008 | Kellner et al. |
| 2008/0319602 | A1 | 12/2008 | McClellan et al. |
| 2011/0021234 | A1* | 1/2011 | Tibbitts et al. ................ 455/517 |
| 2011/0043652 | A1 | 2/2011 | King et al. |
| 2011/0054770 | A1 | 3/2011 | Allen et al. |
| 2012/0053966 | A1 | 3/2012 | Kolodziej |
| 2012/0096403 | A1 | 4/2012 | Jung et al. |
| 2013/0225205 | A1 | 8/2013 | Haney |
| 2013/0226453 | A1 | 8/2013 | Trussel et al. |
| 2013/0261942 | A1* | 10/2013 | McQuade et al. ............ 701/115 |
| 2014/0018097 | A1 | 1/2014 | Goldstein |
| 2014/0129136 | A1 | 5/2014 | Celia |
| 2015/0168154 | A1 | 6/2015 | Boerger |

FOREIGN PATENT DOCUMENTS

| | | |
|---|---|---|
| KR | 10-0559986 B1 | 3/2006 |
| KR | 10-2007-0104414 A | 10/2007 |
| KR | 10-2011-0040280 A | 4/2011 |

OTHER PUBLICATIONS

Communication dated Nov. 6, 2015 issued by United States Patent and Trademark Office in counterpart U.S. Appl. No. 13/913,977.

Communication dated Oct. 6, 2015 issued by United States Patent and Trademark Office in counterpart U.S. Appl. No. 13/915,032.

Communication dated Oct. 28, 2015 issued by United States Patent and Trademark Office in counterpart U.S. Appl. No. 13/914,892.

Office Action dated Mar. 28, 2016 issued by the U.S. Patent Office for U.S. Appl. No. 13/914,892.

Final Office Action issued in related U.S. Appl. No. 13/915,032, mailed Apr. 29, 2016.

Final Office Action issued in related U.S. Appl. No. 13/913,977, mailed Apr. 21, 2016.

* cited by examiner

SERVICE PROVIDING DEVICE, SERVICE PROVIDING SYSTEM INCLUDING USER PROFILE SERVER, AND SERVICE PROVIDING METHOD FOR SERVICE PROVIDING DEVICE

CROSS-REFERENCE TO RELATED APPLICATIONS

This application is a National Stage Application of International Patent Application No. PCT/KR2013/005132, which claims priority from U.S. Provisional Application No. 61/658,095, filed on Jun. 11, 2012, in the United States Patents and Trademark Office, and Korean Patent Application Nos. 10-2012-0143705, filed on Dec. 11, 2012, 10-2013-0006105, filed on Jan. 18, 2013, and, 10-2013-0066380 filed on Jun. 11, 2013, in the Korean Intellectual Property Office, the disclosures of which are incorporated herein by reference in their entireties.

BACKGROUND

1. Field

Devices and methods consistent with exemplary embodiments relate to a service providing system which includes a service providing device, a service providing system including a user profile server, and a service providing method of a service providing device, and more particularly, to a service providing device which provides a suitable device by determining a user, a service providing system including a user profile server, and a service providing method of a service providing device.

2. Description of the Related Art

Recently, communication technologies and vehicle-related technologies have been rapidly developed. Accordingly, a navigation system which includes various sensors such as a global positioning system (GPS) and an accelerometer, may be used to provide map information to many terminal devices. Further, various functions which help parking and driving of a vehicle are being implemented, and a vehicle having enhanced connectivity with a terminal device has been introduced.

An increase in vehicles also causes an increase in traffic accidents. As a result, interests in safe driving are increasing. A significant portion of traffic accidents are attributable to signal violations, traffic law violations such as speeding, using of a terminal while driving, inexperienced driving, negligent driving, and the like. In particular, regulations related to use of a terminal device while driving have been strengthened.

A vehicle occupant may select contents stored in a storage medium to receive desired contents in a vehicle. A related-art service providing device has limitations in providing a user with a large amount of contents. In addition, a user may collect desired contents from a lot of contents to receive desired contents, and may feel uncomfortable. Furthermore, when many users are in a vehicle, a service providing device provides contents which correspond to a manipulation command by a specific user. That is, the content providing device provides only contents requested by the specific user regardless of preference by the other users in the vehicle, and thus, some users receive undesired contents, thus feeling uncomfortable.

SUMMARY

Exemplary embodiments overcome the above disadvantages and other disadvantages not described above. Also, one or more exemplary embodiments are not required to overcome the disadvantages described above, and an exemplary embodiment may not overcome any of the problems described above.

An exemplary embodiment relates to the support of safety driving which is suitable for a driving pattern of a driver and relates to providing contents based on preferences of all users riding in a vehicle.

According to an aspect of an exemplary embodiment, a service providing device mounted on a vehicle includes a communicator for receiving a terminal signal from at least one terminal device, and a controller which determines the distance to the terminal device from the received terminal signal, determines a user riding in the vehicle based on the determined distance, and provides a preset service based on the determined user and terminal information included in the terminal signal.

The controller may determine a terminal device which is located within a preset distance from the service providing device, and determine a user riding in the vehicle based on a terminal signal received from a terminal device within the preset distance.

In response to the user being determined as a driver, the communicator may receive driving information from the vehicle, transmit to a user profile server the received driving information, and receive from the user profile server accumulated driving information based on a preset event, and The controller may control at least one of the vehicle and the terminal device in accordance with a preset condition using the received accumulated driving information.

In response to receiving the accumulated driving information, the controller may perform at least one of calling function restriction of the terminal device, video playback function restriction of the terminal device, restriction of a maximum speed of the vehicle, and guiding a detailed path based on an occurrence of an event.

The preset event may be an event in which at least one of calling, video playback, speed violation, sudden braking, sudden acceleration, and the number of accidents exceeds a preset frequency.

The service providing device may further include an outputter to output contents, wherein the communicator, when it is determined that at least one passenger is included in the users riding the vehicle, may transmit the terminal information and contents recommendation request to a user profile server, receive contents recommendation information generated based on the terminal information, and the controller, based on the received contents recommendation information, and control the outputter to output a recommended content.

In response to a plurality of contents recommendation information on a plurality of users being received, the controller may control the outputter to output a recommended content based on contents recommendation information which is common to the plurality of users.

According to an exemplary embodiment, a user profile server includes a communicator configured to receive from a service providing device at least one of driving information and terminal information, and a controller configured to generate accumulated driving information which accumulates pre-received driving information, and analyze a user's driving pattern or generate contents recommendation information from the received terminal information; wherein the communicator, in response to a preset event occurring with respect to a user who is determined to be a driver, transmits the accumulated driving information including the user's driving pattern to the service providing device, and in response to a contents recommendation request being received, transmits the generated contents recommendation information.

According to an exemplary embodiment, a service providing method of a service providing device mounted in a vehicle includes receiving a terminal signal from at least one terminal device; determining distance with the terminal device from the received terminal signal; determining a user riding in a vehicle based on the determined distance; and providing a preset service based on the determined user and terminal information included in the terminal signal.

The determining distance may include determining a terminal device which is located within a preset distance from the service providing device, and the determining a user may include determining a user riding in the vehicle based on a terminal signal received from a terminal device within the preset distance.

In response to the user being determined as a driver, the method may include receiving from the vehicle driving information and transmitting to a user profile server the received driving information; and receiving from the user profile server accumulated driving information based on a preset event, wherein the providing the service comprises controlling at least one of the vehicle and the terminal device according to a preset condition using the received accumulated driving information.

The providing the service may include, in response to receiving the accumulated driving information, performing at least one of calling function restriction of the terminal device, video playback function restriction of the terminal device, restriction of maximum speed of the vehicle, and guiding a detailed path based on an occurrence of an event.

The preset event may be an event in which at least one of calling, video playback, speed violation, sudden braking, sudden acceleration, and the number of accidents exceeds a preset frequency.

When it is determined that at least one passenger is included in the users riding in the vehicle, the method may include transmitting the terminal information and contents recommendation request to a user profile server; and receiving contents recommendation information generated based on the terminal information, wherein the providing the service comprises outputting a recommended content based on the received contents recommendation information.

In response to a plurality of contents recommendation information on a plurality of users being received, the providing the service may include outputting a recommended content based on contents recommendation information which is common to the plurality of users.

BRIEF DESCRIPTION OF THE DRAWINGS

The above and/or other aspects of the exemplary embodiments will be more apparent with reference to the accompanying drawings, in which.

DETAILED DESCRIPTION

Figure 1:
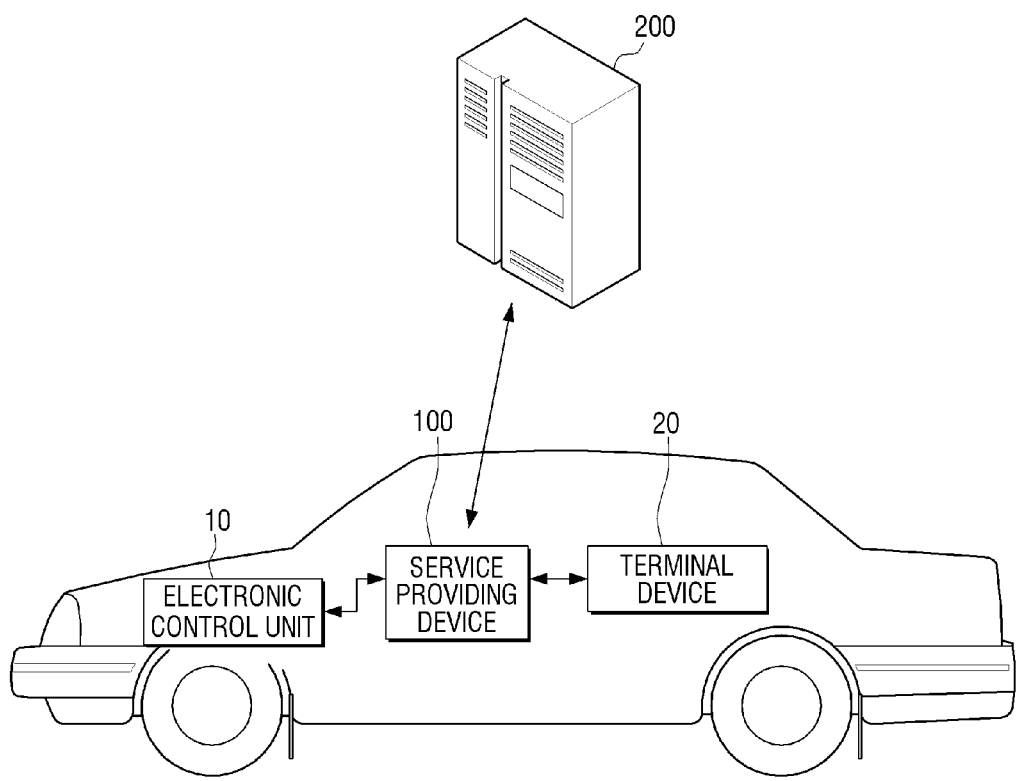
FIG. 1 illustrates a service providing system according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that one or more of the exemplary embodiments can be carried out without those specifically defined matters. Also, well-known functions or constructions are not described in detail since they would obscure the invention with unnecessary detail.

FIG. 1 illustrates a service providing system which is applied to a vehicle according to an exemplary embodiment.

With reference to FIG. 1, a service providing system 1000 includes a service providing device 100, a user profile server 200, an electronic control unit 10, and a terminal device 20.

The service providing device 100 is mounted on a vehicle and performs an operation of a navigation system and/or reproduction of contents. In a cloud service environment, the service providing device communicates with the user profile server 200. In addition, the service providing device 100 may communicate with the terminal device 20, perform operations in accordance with a control command by the terminal device 20, and display various status information and a control menu of a vehicle that is received from the electronic control unit 10.

The service providing device 100 may be connected to the electronic control unit 10 and the terminal device 20 using various communication methods. In one or more exemplary embodiments, the service providing device 100 and the electronic control unit 10 may be connected to each other using a controller area network (CAN) method. The CAN is described later. The electronic control unit 10 may be connected to the service providing device 100, and transmit detected vehicle status information to the service providing device 100. Accordingly, the service providing device 100 may display or store the transmitted vehicle status information. Alternatively, the service providing device 100 may display a vehicle control menu, and when a vehicle control command is input from a user, the service providing device 100 may transmit the received control command to the electronic control unit 10. For example, a user of the service providing device 100 may control a vehicle such as headlight on/off function and a temperature setting. The electronic control unit 10 which receives a control command may control the corresponding module.

In addition, the service providing device 100 may be connected to the terminal device 20 using a universal serial bus (USB) or the like. For example, both the service providing device 100 and the terminal device 20 may include communicators that are configured to be connected to each other by a cable via USB protocol. Alternatively, the service providing device 100 may be connected to the terminal device 20 wirelessly using Wi-Fi or Bluetooth, and the like. For example, the communicators of both the service providing device 100 and the terminal device 20 may be configured to be connected to each other by WiFi, Bluetooth, near field communication (NFC), or some other form of wireless communication.

The service providing device 100 may be built into or otherwise embedded in the vehicle or be detachable from the vehicle. For example, the service providing device 100 may be a head unit (H/U) such as a head unit for a car stereo, a navigator, a tablet personal computer (PC), an electronic picture frame, and the like, which are provided in the vehicle.

The user profile server 200 is a server which communicates with the service providing device 100 under the cloud service environment and provides contents recommendation information to the service providing device 100. Alternatively, the user profile server 200 may provide contents recommendation information to a separate content server and provide contents recommendation to the service providing device 100 based on contents recommendation information.

An electronic control unit 10 is an embedded system and may be used to control at least one of an electrical system and a sub system of the vehicle. The electronic control unit 10 may include an electricity and engine control module, a power train control module, a transfer control module, a brake control module, a central control module, a central timing control module, a general electronic module, a body control module, a suspension control module, and the like. Accordingly, the electronic control unit 10 receives information from diverse sensors of the vehicle and controls overall operation of the vehicle including an automatic transmitter, a drive system, a braking system, a steering system, and the like. The electronic control unit 10 controls the overall operations of a vehicle, and thus, the controlling of the electronic control unit 10 is the same as controlling a vehicle. Therefore, in the present disclosure, the electronic control unit 10 is considered as a vehicle.

For example, the terminal device 20 may include a mobile phone, smartphone, PDA, tablet, and the like which includes a cellular communication module. Using wireless access technology in accordance with cellular communication protocol, the cellular communication module connects the terminal device with an external device such as the user profile server 200 via at least one antenna. The terminal device 20 receives and transmits voice calls, video calls, and wireless signals containing messages, with other communicable devices including input telephone numbers. The terminal device 20 may be controlled by a controller (not shown) which includes at least one processing device, and the like.

To be specific, the service providing device 100 mounted on a vehicle determines, via wired/wireless communication, whether there is a user in a vehicle by receiving a terminal signal from at least one terminal device 20 located closer. In the present disclosure, it is assumed that each user owns a terminal device 20. In other words, it is assumed that a user and the terminal device 20 are considered to be the same.

In an exemplary embodiment, when location information of the terminal device 20 is received, the service providing device 100 compares the present position information of a vehicle with position information received from the terminal device 20, and determines whether the terminal device is within a preset threshold range. If the terminal device 20 is within a preset threshold range, the service providing device 100 determines that a user is in a vehicle.

As another exemplary embodiment, the service providing device 100 may determine a distance of the terminal device 20 using a response time. The response time indicates an amount of time from transmitting a signal by the service providing device 100 to the terminal device 20 and receiving a response signal from the terminal device 20. That is, the service providing device 100 transmits a signal to the terminal device 20 and receives a response signal from the terminal device 20. The service providing device 100 may determine a distance with the terminal device 20 using a response an amount of time between the time to transmit the signal and time to receive the response signal.

The service providing device 100 may receive a terminal signal from the terminal device 20 which is within a preset threshold range, determine a distance with the terminal device 20, and determine whether a user in a vehicle is a driver or a passenger based on the determined distance. For example, the service providing device 100 may determine the terminal device 20 which is closest to the service providing device 100 as a driver. Alternatively, the service providing device 100 may determine a driver by comparing a signal received from the terminal device in terms of a preset direction and distance. For example, when the service providing device 100 is located at a center of a front seat, the service providing device 100 may determine the terminal device 20 that is located at the closest position in a direction facing the service providing device 100 as a driver. In another exemplary embodiment, the service providing device 100 may be connected to the terminal device 20 with a wire, and determine the connected terminal device 20 as a driver. In still another exemplary embodiment, the service providing device 100 and the terminal device 20 may include a near field wireless communication (NFC) module. In this case, the service providing device 100 may determine the terminal device 20 which is in a near field communication module 20.

In some cases, the service providing device 100 may store terminal information according to a preset priority. For example, the service providing device 100 mounted on a vehicle and which is owned by a family may store terminal information in an order of a father, mother, and son. When a user is in a vehicle, the service providing device 100 may compare stored information from connected terminal device 20 according to priority and determine the terminal device 20 which has matching terminal information as a driver. If the service providing device 100 does not recognize the terminal device which is matched with stored terminal information, the service providing device may determine a driver based on a determined distance. In some cases, the service providing device 100 may display a message indicating whether a driver is correct, even when the terminal device 20 which is matched with the stored terminal information is recognized.

Alternatively, a vehicle may include a plurality of sensors. For example, a plurality of sensors may be disposed on a seat, a ceiling corresponding to a seat, a door of a vehicle, and the like. When a user is in a vehicle, the plurality of sensors may recognize a user and transmit a recognition signal to the electronic control unit 10 of a vehicle. The electronic control unit 10 of a vehicle may transmit sensor location and a recognition signal to the service providing device 100. The service providing device 100 may determine whether a driver is in a vehicle from a signal received from a sensor disposed on a driver's seat, a door of a driver's seat, or a ceiling of a driver's seat. If only the driver is in a vehicle, the service providing device 100 may determine one connected terminal device 20 as a terminal device 20 of a driver.

In some cases, a vehicle may include a communication module at a seat, a ceiling corresponding to a seat, a door of a vehicle, instead of a sensor. Each communication module may communicate with the terminal device 20 which is positioned in a corresponding seat and receive terminal information. The received terminal information may be transmitted to the electronic control unit 10, and the electronic control unit 10 may transmit the received terminal information to the service providing device 100. The service providing device 100 may determine a driver using the terminal information received from a communication module corresponding to a driver's seat. Alternatively, a vehicle may include one communication module, and communicate with the terminal device 20 of a user in a vehicle and transmit received terminal information and information on a location or a distance to the electronic control unit 10. The service providing device 100 may determine the terminal device 20 located on a driver's seat as the terminal device of a driver based on terminal information received from the electronic control unit 10, location, and distance. The service providing device 100 may determine the terminal devices 20 other than the devices of a driver as terminal devices of passengers.

A terminal signal received from the terminal device 20 may include terminal information. For example, terminal information may include a number, identification information, and current position information of the terminal device 20.

The service providing device 100 may provide a safety driving service for a user who is determined to be a driver. Also, if it is determined that at least one passenger is included from among a plurality of users in a vehicle, contents recommendation providing service may be provided.

As a first example, the safety driving service is described. The service providing device 100 receives vehicle driving information from a vehicle. For example, driving information may include the number of calls, a calling time, the number of video playback, a video playback time using the terminal device 20, along with driving time, driving distance, current speed, average speed, sudden braking, sudden acceleration, the number of speed violations, the maximum speed upon a violation of the speed limit, a signal violation, and accidents-related data.

Driving information may be detected using a GPS or other sensor included in the service providing device 100, and be received from the electronic control unit 10 or the terminal device 20 in a vehicle. For example, the service providing device 100 may receive, from the terminal device 20, information related to a call or a video, and receive, from the electronic control unit 10, information related to a speed, driving time, and distance. The driving information received by the service providing device 100 is transmitted to the user profile server 200.

The user profile server 200 generates a user profile for individual users, accumulates received driving information on a corresponding user profile, and generates accumulated driving information. Using the accumulated driving information, a user driving pattern is analyzed. When a preset event happens, the user profile server 200 transmits accumulated driving information which includes a user driving pattern to the service providing device 100. The service providing device 100 receives accumulated driving information of a user from the user profile server 200, and controls at least one of the electronic control unit 10 and the terminal device 20 according to a preset condition.

Next, a contents recommendation providing service (or service for providing recommendation contents) is described. The service providing device 100 transmits received terminal information to the user profile server 200. As an example, the user profile server 200 may record and store contents use information of at least one user in each vehicle. For example, the user profile server 200 may record and store contents use information which provides contents when users A and B are in a vehicle Accordingly, when terminal information on at least one terminal device 20 is received from the service providing device 100, the use profile server 200 obtains contents use information which corresponds to received terminal information from among prestored contents use information. Then, through a preset recommendation algorithm, the user profile server 200 may generate contents information which is most suitable to a user who is in a vehicle, and transmit the information to the service providing device 100 of the vehicle.

Accordingly, the service providing device 100 may output contents based on contents recommendation information received from the user profile server 200. In some cases, the user profile server 200 may transmit contents recommendation information to a separate contents server (not shown), or a contents server may transmit recommended contents to the service providing device 100.

A plurality of service providing device 100 may be disposed in a vehicle. For example, the service providing device 100 may be disposed on a front part of a front seat and a front part of a back seat. In this case, the service providing device 100 which is disposed at a front part of a front seat of a vehicle may operate as a main device, and the service providing device 100 disposed at a front part of a back seat may operate as a sub device. Here, the sub device may operate by control of a main device.

For example, the service providing device 100 which is disposed on a front part of a front seat of a vehicle may receive content recommendation information from the user profile server 200, and output the recommended contents to the service providing device 100 which is disposed at a front part of a back seat. The service providing device 100 which is disposed at a front part of a back seat may output the received recommended contents. If the recommended contents are video contents, the service providing device 100 which is disposed at a front part of a front seat may not output video contents, and only the service providing device 100 which is disposed at a front part of a back seat may output video contents.

Hereinabove, the service providing system 1000 has been described in brief. Hereinbelow, a configuration of the service providing device 100 and the user profile server 200 is described.

Figure 2:
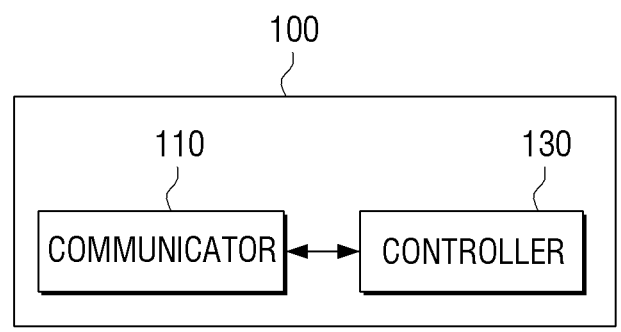
FIG. 2 is a block diagram of a service providing device according to an exemplary embodiment.

FIG. 2 is a block diagram of a service providing device according to an exemplary embodiment.

Referring to FIG. 2, the service providing device 100 includes the communicator 110 and the controller 130. To be specific, the communicator 110 receives a terminal signal from at least one terminal device. The communicator 110 communicates with at least one terminal device 20 such as smartphone which may communicate wirelessly.

When it is determined that a user of the terminal device 20 is a driver, the communicator 110 may receive driving information from a vehicle, transmit received driving information to a user profile server, and receive accumulated driving information from a user profile server, when a preset event happens or otherwise occurs. In some cases, the service providing device 100 may further include a storage to store driving information.

Timing to transmit driving information to the user profile server 200 may be determined using various methods. For example, transmission timing may be set as an absolute time unit such as every 10 minutes, or may be set to transmit driving information at the time to end driving. Alternatively, the timing may be set to transmit driving information at the timing of a specific event such as when a speed limit violation occurs or when a call is finished.

Alternatively, if it is determined that at least one passenger is included from among users in a vehicle, the communicator 110 may transmit at least one of terminal information and contents recommendation request to the user profile server 200. The terminal information may include not only information about the terminal device 20 but also contents playback history output from the terminal device 20, contents information stored in the terminal device 20, and the like. For example, the communicator 110 may transmit terminal information including contents-related information periodically, and, when a contents recommendation command is input by a user, may transmit a contents recommendation request signal to the user profile server 200.

Based on the terminal information, the communicator 110 may receive contents recommendation information from the user profile server 200. Alternatively, the communicator 110 may receive from a separate contents server (not shown) recommended content itself.

Using a terminal signal received from at least one terminal device 20, the controller 130 determines a distance with the terminal device 20 and a user in a vehicle based on the determined distance. The controller 130 may determine the terminal device 20 is located within a preset distance from the service providing device 100, and determine a user in a vehicle based on a terminal signal received from the terminal device 20 within a preset distance. Then, the controller 130 may provide a preset service based on terminal information including in a terminal signal.

For example, first to third terminal devices 20 may be located around a vehicle. Therefore, the communicator 110 may communicate with the first to third terminal devices 20 and receive a terminal signal from the first to third the terminal devices 20. A terminal signal may include terminal information. Here, the terminal information may include location information of each of the first to the third terminal devices 20, a number of the terminal device 20, and identification information.

In an exemplary embodiment, the service providing device 100 mounted in a vehicle may be located within a threshold range which is preset by a driver who has a smart key or may supply driving power according to a control command of a driver. According to this event, when operation of the service providing device 100 starts, the communicator 110, in accordance with a control command of the controller 130, may request a terminal signal to the first to the third terminal devices 20 around a vehicle and receive the signal. In another exemplary embodiment, after operation of the service providing device 100 starts, the communicator 110 may periodically request a terminal signal to the first to third terminal devices 20 and receive the signal.

As described above, a terminal signal including terminal information of the first to third terminal devices 20 is received through the communicator 110. Based on preset threshold distance information and location information included in terminal information of each of the first to third terminal devices 20, the controller 130 may determine whether the first to third terminal devices 20 are located within a preset distance.

To be specific, the controller 130 may periodically collect location information of a vehicle through the communicator 110 and store information in a storage. Accordingly, when terminal information is received from each of the first to third terminal devices 20, the controller 130 may compare information of position which is recently stored from among location information prestored in a storage and location information included in terminal information received from each of the first to third terminal devices 20, and determine which terminal device from among the first to third terminal devices 20 is within a preset distance. Based on the determination, the controller 130 may determine whether a user is in a vehicle and whether the user is a driver of the vehicle.

As another exemplary embodiment, the service providing device 100 transmits a signal to the first to third terminal devices 20 nearby. In response to a received signal, the first to third terminal devices 20 transmit a response signal to the service providing device 100. The service providing device 100 transmits a signal to the terminal device 20, and determines a distance to the terminal device 20 using time until a response signal is received. Based on determined distance, the service providing device 100 may determine whether a user is in a vehicle, and determine a driver from among users in a vehicle.

For example, the service providing device 100 may determine the terminal device 20 which is closest to the service providing device 100 as a driver. Alternatively, the service providing device 100 may compare a signal received from the terminal device 20 in terms of a preset direction and distance and determine a driver. The service providing device 100 may determine a terminal device 20, other than a terminal device 20 of a driver, as a passenger. As described above, the present disclosure assumes that each user owns each terminal device 20. Therefore, the terminal device 20 is the same as a user.

When it is determined that a user is a driver, the service providing device 100 may provide a safety driving service for a user who is determined to be a driver.

The controller 130 controls the communicator 110 to transmit driving information to the user profile server 200. In some cases, the service providing device 100 may include a storage and may store driving information in the storage. In this case, the controller 130 may control the communicator 110 to transmit stored driving information.

When receiving accumulated driving information from the user profile server 200, the controller 130 determines an event occurred. For example, a preset event may be at least one of a calling, video playback, speed violation, sudden braking, sudden acceleration, the number of accidents exceeds a preset frequency. Whether or not a preset event occurs may be determined by the user profile server 200, and accumulated driving information may be transmitted. In addition, the controller 130 controls at least one of a vehicle or a terminal device according to a preset condition using received accumulated driving information.

When it is determined that at least one passenger is included from among users in a vehicle, the service providing device 100 may provide a recommended contents providing service.

The controller 130 controls to transmit, to the user profile server 200, terminal information and a contents recommendation request of the terminal device 20 which is located within a preset distance, through the communicator 110. When receiving contents recommendation information which is generated based on terminal information of the terminal device 20, the controller 130 may control the outputter (not shown) to output recommended contents based on recommended information.

For example, if it is determined that the first terminal device 20 from among the first to the third terminal device 20 is located within a preset distance from the service providing device 100, the controller 130, through the communicator 110, controls to transmit terminal information included in a terminal signal received from the user profile server 200 to the user profile server 200.

Accordingly, based on terminal information of the first terminal device 20 which is received from the service providing device 100, the user profile server 200 obtains contents use information of a user of the first terminal device 20 from among each user's contents use information, based on terminal information of the first terminal device 20. Then, based on preset recommendation algorithm, the user profile server 200 generates contents recommendation information from contents user information of a user of the first terminal device 20. Here, contents recommendation information may be information to provide contents preferred by a user from among contents provided to a user riding in a vehicle. However, the present disclosure is not limited thereto, and contents recommendation information may be contents preferred by a user from among contents provided to a user riding a vehicle.

When the contents recommendation information (or recommendation content information) is generated, the user profile server 200 may transmit the generated contents recommendation information to the service providing device 100. Accordingly, the controller 130 may control an outputter to provide recommendation contents related to contents recommendation information received from a user profile server 300. On the other hand, when a plurality of contents recommendation information with respect to a plurality of users is received, based on the contents recommendation information received from the user profile server 200, the controller 130 may control an outputter to provide recommended contents based on contents recommendation information which is common to a plurality of users. In addition, when a plurality of contents recommendation information with respect to a plurality of users is received, the controller 130 may control the outputter to provide recommendation contents based on contents recommendation information received from the user profile server 200 with respect to a user who is in the top priority among a plurality of users.

In some cases, the user profile server 200 may transmit contents recommendation information to a separate contents server (not shown), and based on the received contents recommendation information, the contents server may transmit the recommended contents to the service providing device 100.

Figure 3:
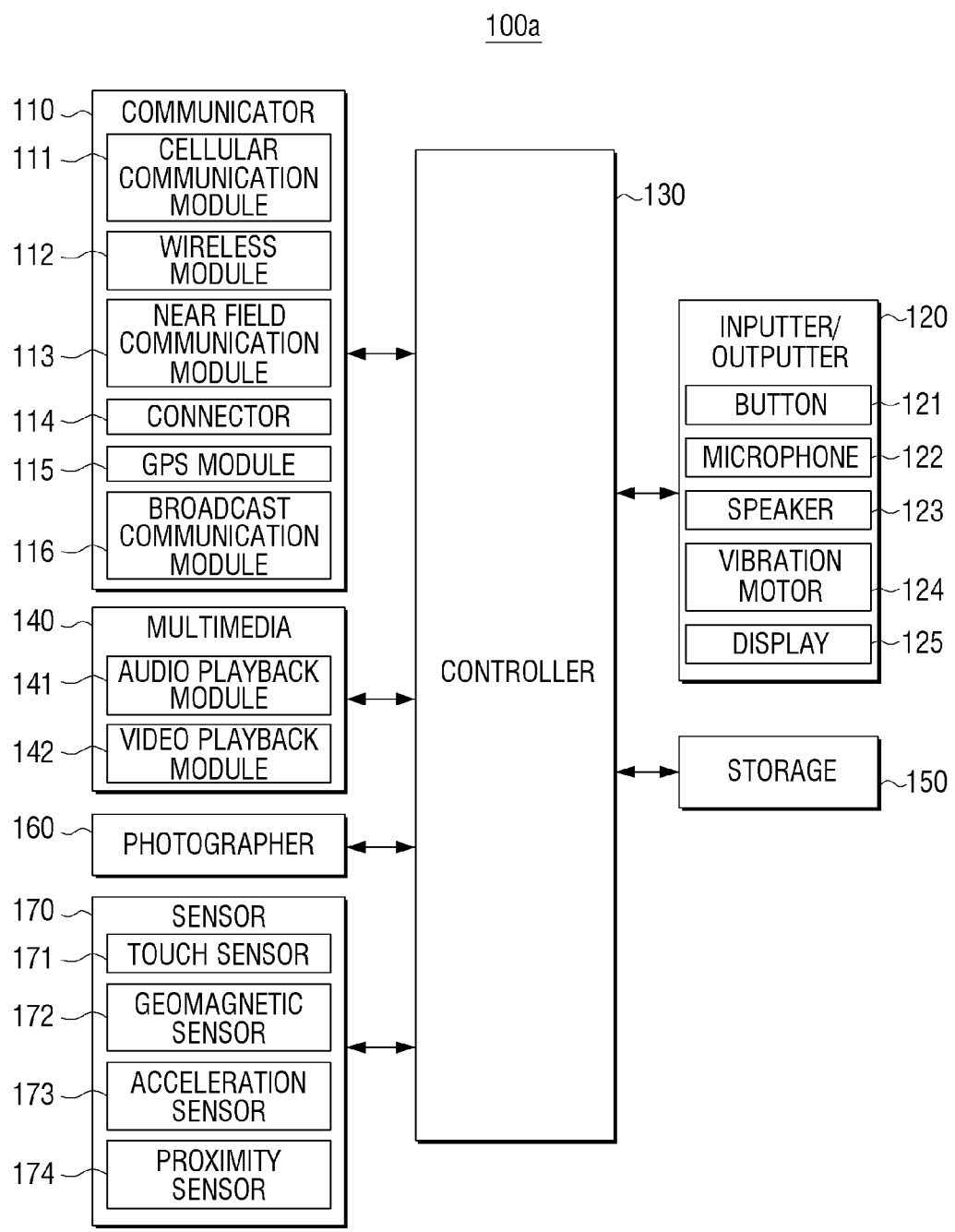
FIG. 3 is a block diagram of a service providing device according to another exemplary embodiment.

FIG. 3 is a block diagram of a service providing device according to another exemplary embodiment.

With reference to FIG. 3, the service providing device 100a may include a communicator 110, an inputter/outputter 120, a controller 130, a multimedia unit 140, a storage 150, a photographer 160, and a sensor 170.

The communicator 110 may include a cellular communication module 111, a wireless local area network (LAN) module 112, a near field communication module 113, a connector 114, a global positioning system (GPS) module 115, and a broadcast communication module 116.

The cellular communication module 111 connects the service providing device 1001 to an external device (in particular, a base station of a cellular system) through one or more antennas using wireless access technology according to a cellular communication protocol in accordance with control of the controller 130.

In addition, the cellular communication module 111 may transmit or receive a wireless signal containing voice calls, video calls, short messaging service (SMS) messages, or multimedia messaging service (MMS) message to and from a communicable device, such as a mobile phone, a smartphone, a tablet PC or other derives, which has a phone number that may be input to the service providing device 100a.

The wireless LAN module 112 may access the internet at a place in which a wireless access point (AP) is installed, according to control of the controller 130. The wireless LAN module 112 supports wireless LAN standards (IEEE802.11x) of the Institute of Electrical and Electronics Engineers (IEEE).

The near field communication module 113 or local communication module may perform wireless local communications between the service providing device 100a and an external device according to control of the controller 130. The local communication methods may include Bluetooth, infrared data association (IrDA) communication, and near field communication (NFC), and the like.

The connector 114 provides an interface such as universal serial bus (USB) 2.0, USB 3.0, high definition multimedia interface (HDMI), institute of electrical and electronics engineers (IEEE) 1394, and the like, between the service providing device and diverse devices. The connector 114 may be used as an interface which links the service providing device 100a with an external device or a power source. According to control of the controller 130, the connector 114 may transmit data stored in the storage 150 to an external device or receive data from an external device through a cable which is connected to the connector 114. Using a cable connected to the connector 114, power may be received from a power source or a battery may be charged (not shown).

In some cases, a service providing device 100a may recognize the terminal device 20 which is connected with the connector 114 as a driver. As described above, in one or more exemplary embodiments each user in the present disclosure may have a terminal device 20. Therefore, it is considered that a user and the terminal device 20 are the same. The service providing device 100a may recognize one terminal device 20 which is connected with the connector 114 as a driver. Alternatively, by receiving terminal information from the terminal device 20 connected with the connector 114, the service providing device 100a may recognize a user only when information of the received terminal information is the same as the prestored terminal information of a user.

The GPS module 115 receives a radio wave from a plurality of earth orbiting global positioning system (GPS) satellites, and measures a location of the service providing device 100a using time of arrival from the GPS satellites to the service providing device 100a and GPS parameters.

The broadcast communication module 116 may receive a broadcast signal (e.g., a TV broadcast signal, a radio broadcast signal, or a data broadcast signal) and additional broadcast information (e.g., an electronic program guide (EPG) or an electronic service guide (ESG)) from a broadcast station through a broadcast communication antenna (not shown) according to control of the controller 130.

The inputter/outputter 120 includes a button unit 121, a microphone 122, a speaker 123, a vibration motor 124, and a display 125.

At least one button unit 121 may be provided on a front, side, or back of the body of the service providing device 100a such as a push type or a touch type, and may include at least one of a power/lock button, a volume control button, a menu button, a home button, a back button, and a search button. In some cases, the button unit 121 may be implemented as a soft key type which is displayed on the display 125, instead of a physical button.

The microphone 122 receives speech or other sound and generates an electrical signal according to control of the controller 130.

The speaker 123 may output sounds corresponding to diverse signals (e.g., wireless signals, broadcast signals, digital audio files, digital video files, or photographing) of the cellular communication module 111, the wireless LAN module 112, the local communication module 113, the multimedia unit 140, or the photographer 160 to the outside of the service providing device 100a according to control of the controller 130.

The speaker 123 may receive audio contents from a content server (not shown) through the communicator 110 and output the audio contents, or output audio contents prestored in the storage 150.

The speaker 123 may output sounds (e.g., button manipulation sounds or ring back tone corresponding to a call) corresponding to functions of the service providing device 100a. One or more speakers 123 may be provided on appropriate locations of the body of the service providing device 100a.

The vibration motor 124 may convert an electrical signal into a mechanical vibration according to control of the controller 130. The vibration motor 124 may operate in response to the user's touch gesture or continuous movement of a touch which is detected on the display 125.

The display 125 displays multimedia contents, images, video, text, and the like, according to the control of the controller 130. The display 125 may receive video contents from a content server through the communicator 110 and output the video contents, or output video contents pre-stored in the storage 150.

The display 125 may be implemented in a general display panel which does not have a touch input function, or a touch display panel which recognizes user manipulation using a proximity sensor or a touch sensor. If the display is a touch display, the display unit may receive at least one touch gesture through the user's body (e.g. fingers including a thumb) or a detectable input means (e.g., a stylus pen).

Such a user interface may include a predetermined touch area, a soft key, and a soft menu. The display 125 may transfer an electronic signal corresponding to at least one touch gesture input through the user interface to the display 125 through a liquid crystal display (LCD) controller. In addition, the display 125 may detect continuous movement of a touch, and transfer an electronic signal corresponding to continuous or discontinuous movement of the touch to the LCD controller.

The display 125, for example, may be implemented in a resistive way, capacitive way, infrared way, or acoustic wave way.

The display 125 converts a detection signal regarding the user's gesture detected by the touch sensor into a digital signal (e.g. X and Y coordinates), and transfers the digital signal to the controller 130. The controller 130 may perform a control operation corresponding to the user's gesture input through the display 125 using the received digital signal. For example, the controller 130 may select a soft key displayed on the display 125 in response to the user's gesture or execute an application corresponding to the soft key.

The user's gesture is not limited to direct contact between the display 125 and the user's body or the touchable input means, but includes methods by non-contact or indirect contact. A sensitivity of the user's gesture can be detected by the display 125 and may vary according to performance or structure of the service providing device 100a.

The controller 130 may include a central processing unit (CPU), a read-only memory (ROM) which stores a control program to control the service providing device 100a, and a random access memory (RAM) which remembers a signal or data input from outside of the service providing device 100a and which is used as a memory area for jobs performed by the service providing device 100a. The CPU may include at least one of a single core processor, a dual core processor, a triple core processor, a quad core processor, and the like. The CPU, the ROM, and the RAM are connected to one another through a local bus. The controller 130 controls the communicator 110, the inputter/outputter 120, the multimedia unit 140, the storage 150, the photographer 160, and the sensor 170.

The multimedia 140 may include an audio playback module 141 and a video playback module 142. The audio playback module 141 may reproduce stored or received digital audio files (e.g. files having file extensions such as "mp3," "wma," "ogg," or "way") according to control of the controller 130. The video playback module 142 supports diverse forms of codec so as to reproduce digital video files. That is, the video playback module 142 reproduces a video file using a pre-stored codec which is suitable for a codec format of the video file to reproduce. The audio playback module 141 and the video playback module 142 of the multimedia unit 140 may be included in the controller 130.

The storage 150 stores diverse types of multimedia data processed by the controller 130, content data, and data received from an external source.

The storage 150 may also store programs used to control the service providing device 100a or the controller 130, and applications. Hereinafter, the storage may include ROM, RAM, or a memory card (e.g., a secure digital (SD) card and a memory stick) which is attachable to or detachable from the service providing device 100a. In addition, the storage may include a non-volatile memory, a volatile memory, a hard disk drive (HDD), and a solid state drive (SSD).

The storage 150 may store received driving information and store terminal information of at least one terminal device 20 which is connected to the server providing device 100a. Also, the storage 150 may store recommended contents or contents recommendation information received from the user profile server 200 or a contents server. In some cases, the storage 150 may store and output a part of streaming contents instead of contents themselves, and store a next part.

The photographer 160 photographs a still image or a moving image according to control of the controller 130. The photographer 160 may include a plurality of cameras. The photographer 160 may include a supplementary light source, for example, a flash.

The photographer 160 transfers a photographed image to the controller 130. The controller 130 analyzes an image, detects the user's movement or shape, and performs a control operation corresponding to the detected movement or shape. For example, the user's movement may indicate the movement of the user's hand which is detected through the photographer 160. The user's shape may indicate the user's facial shape which is detected through the photographer 160.

In another exemplary embodiment, the service providing device 100a may detect the user's movement using a device such as an infrared detector, and execute or control an application in response to the user's movement.

Furthermore, the photographer 160 may be provided separately from the service providing device 100a. For example, the service providing device 100a may be provided inside a vehicle, and the photographer 160 may be provided outside the vehicle (e.g. a front side or back side of the vehicle). The service providing device 100a may be connected to the photographer 160 through a cable or wirelessly so that the service providing device 100a can display an image of the front side or back side of the vehicle photographed by the photographer 160.

The sensor 170 may include at least one of a touch sensor 171, a geomagnetic sensor 172, an acceleration sensor 173, and a proximity sensor 174.

The touch sensor 171 is capable of detecting a user's touch of the display 125. Methods of the user's touch using the touch sensor 171 include a capacitive method and a piezoelectric method. The touch sensor 171 may be implemented in multiple methods. The touch sensor 171 may constitute the display together with a display panel.

A user of the touch sensor 171 is capable of inputting an indication on the display screen by pressing the touch screen using a body part such as a finger or a detectable input means. The touch sensor 171 uses capacitance change, resistance change, or light change.

The geomagnetic sensor 172 senses azimuth by detecting terrestrial magnetism so that direction of the service providing device 100a can be recognized. The acceleration sensor 173 processes an output signal and measures dynamic force, such as acceleration, vibration, and impact of an object, thereby sensing a change in a moving speed of the service providing device 100a or a strength of force. The proximity sensor 174 senses whether or not the service providing device 100a approaches an object.

Although not shown in FIG. 3, the sensor unit 170 of the service providing device 100a may further include at last one of a gravity sensor for sensing a direction of gravity, a gyro sensor for recognizing a total of six axes by rotating an existing acceleration sensor, an orientation sensor for automatically sensing horizontal and vertical frames of content such as an image and automatically rotating and arranging the content, an illumination sensor for sensing intensity of illumination around the service providing device 100a, an altitude measuring sensor for measuring atmospheric pressure, an RGB sensor for sensing color of an object, a distance measuring sensor for measuring a distance using ultrasonic waves or infrared light, and a hall sensor for sensing a change in the voltage according to strength of magnetic field.

The service providing device 100a may directly detect driving information of a vehicle using each sensor of the sensor 170. The service providing device 100a may transmit the directly-detected driving information to the user profile server 200. Alternatively, after determining suitable driving information by combining directly-detected driving information and driving information received from a vehicle, the service providing device 100a may transmit to the user profile server 200 the determined driving information. A sensor of the sensor 170 may be added or deleted according to performance of the service providing device 100a.

A power unit (not shown) supplies power to the service providing device 100a. The power unit may be implemented as a rechargeable battery and may further include a voltage converter which converts an external power supply and supplies converted power to the rechargeable battery. The power unit may supply power to the service providing device 100a in diverse modes, such as maximum performance mode, general mode, power saving mode, and standby mode, according to power management control of the controller 130.

It is not necessary that all the components of the above-described service providing device 100a are included, but according to an exemplary embodiment, some components may be included. Hereinbelow, the components of the user profile server 200 is described.

Figure 4:
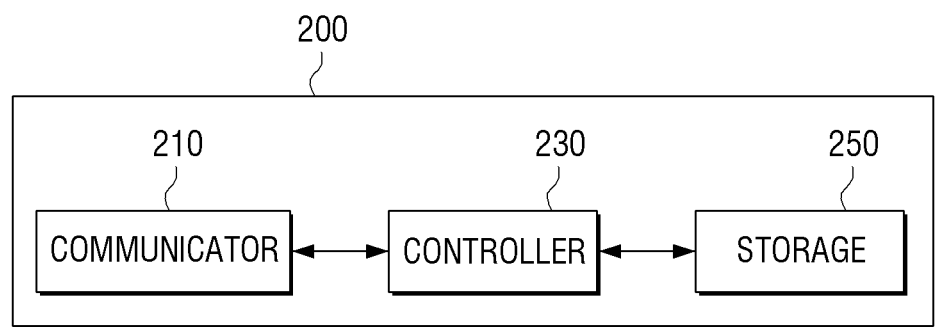
FIG. 4 is a block diagram of a user profile server according to an exemplary embodiment.

FIG. 4 is a block diagram of a user profile server according to an exemplary embodiment.

According to FIG. 4, the user profile server 200 includes a communicator 210, a controller 230, and a storage 250.

Referring to FIG. 4, the communicator 210 receives at least one from among driving information and terminal information from the service providing device 100. The communicator 210 receives driving information with respect to the terminal device 20 which is determined as a driver of a vehicle. The communicator 210 receives terminal information with respect to the terminal device 20 of a user riding a vehicle. Terminal information may include contents playback history and contents preference along with user information.

The storage 250 stores driving information and terminal information.

The controller 230 generates a user profile with respect to respective users of the terminal devices 20. Alternatively, the controller generates a profile with respect to a vehicle. The controller 230 controls the storage 250 to receive terminal information of a plurality of terminal devices 20 and store respective driving information or terminal information related to contents to corresponding user profiles. By accumulating received driving information, the controller generates accumulated driving information and analyzes user operation patterns. Alternatively, the controller 230 generates contents recommendation information from received terminal information.

When receiving a preset event related to a driver from the service providing device 100, the communicator 210 transmits to the service providing device 100 accumulated driving information including a user's driving pattern. In addition, in response to receiving contents recommendation request from the service providing device 100, the communicator 210 transmits the generated contents recommendation information to the service providing device 100. In some cases, the communicator 210 may transmit the generated contents recommendation information to a separate contents server, and the contents server may transmit the recommended contents to the service providing device 100.

Until now, the components of the service providing device 100 and the user profile server 200 have been described. Hereinbelow, a process of the driving information transmission and a process for controlling a vehicle or a terminal device using accumulated driving information is further described.

Figure 5:
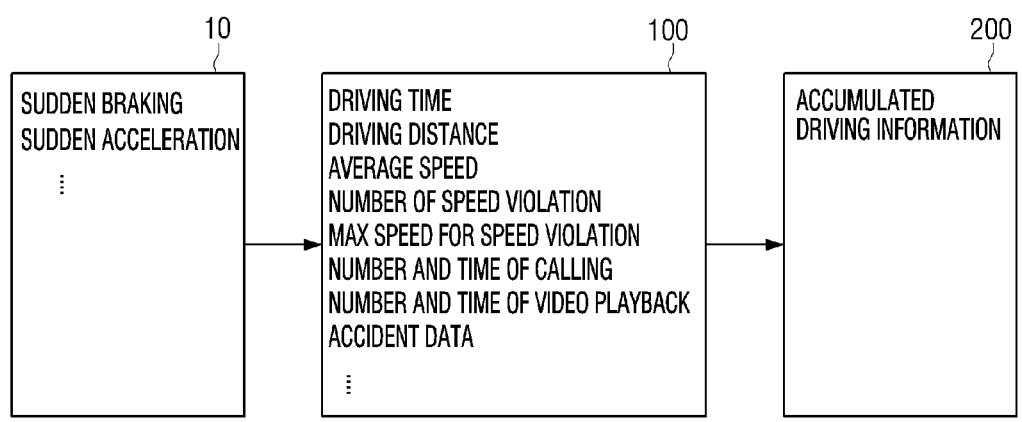
FIG. 5 is a diagram illustrating a process for transmitting driving information according to an exemplary embodiment.

FIG. 5 is a diagram illustrating a process for transmitting driving information according to an exemplary embodiment.

Referring to FIG. 5, there is a vehicle 10, a service providing device 100, and a user profile server 200. The service providing device 100 receives and transmits data through communication with an electronic control unit of the vehicle 10. However, the electronic control unit is a part which controls the entire functions of the vehicle 10, and thus, in the present disclosure, a vehicle is considered the same as the electronic control unit.

A part of the driving information (e.g., sudden braking and sudden acceleration, etc.) which are detected from the vehicle 10 are transmitted to the connected service providing device 100. The service providing device 100 receives driving information from a vehicle. In some cases, the service providing device 100 may detect driving information by itself.

The driving information received from the service providing device 100 may include driving time, driving distance, and average speed, and the like. In addition, the service providing device 100 may detect the number of speed violations, maximum speed upon violation, the number and time of a call, the number and times of video playback, the number and times of web access, accident occurrence history, a slow driving area, and the like.

The service providing device 100 transmits received driving information to the user profile server 200 based on a preset condition. For example, the transmitting timing may be set as an absolute time unit such as every 10 minutes, or may be set to transmit driving information at the time that driving ends. Alternatively, the timing may be set to transmit driving information at the timing of a specific event such as, when a speed limit violation occurs or when a call is finished. Alternatively, the service providing device 100 may detect sudden braking and shock, find out points of accidents using map information, and transmit information such as calling history at the time of accident, speed limit violation, slower driving, and the like, to the user profile server 200.

The user profile server 200 generates a user profile with respect to individual users and store the driving information received from the service providing device 100 in a corresponding user profile. By accumulating received driving information, accumulated driving information is generated, and a user's driving pattern is analyzed. For example, driving patterns such as an entire driving distance of 200 km, and average driving speed of 60 km/h, a calling history (5 times, 21 minutes), an accident (1 time), the number of calling at the time of accident (1 time, 7 minutes), and the like, are analyzed.

When a preset event happens, the user profile server 200 transmits, to the service providing device 100, accumulated driving information including a user's driving pattern. A preset event may be an event including at least one of a call, video playback, speed violation, sudden braking, sudden acceleration, and the number of accidents that exceeds a preset frequency. The service providing device 100 which receives the accumulated driving information controls at least one of a vehicle and a terminal device according to a preset condition. Hereinbelow, examples in which the service providing device 100 controls a vehicle and a terminal device are described.

Figure 6:
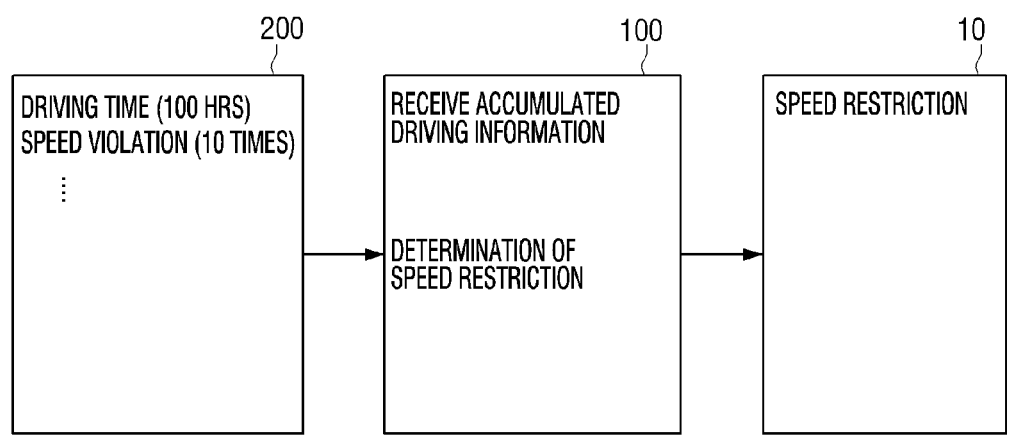
FIGS. 6 through 8 are diagrams illustrating a control process using received accumulated driving information according to exemplary embodiments.
Figure 7:
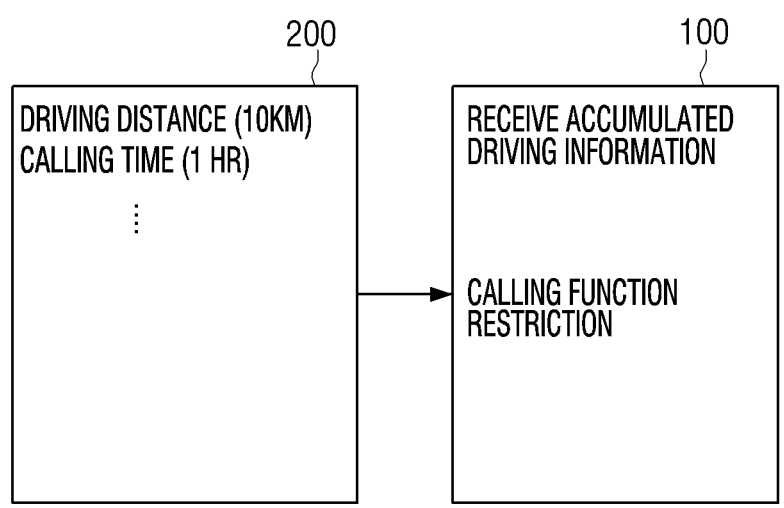
Figure 8:
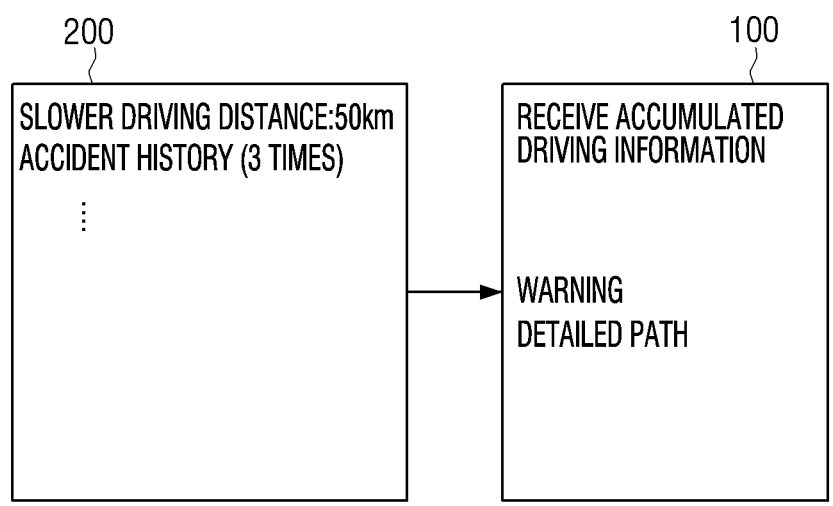

FIGS. 6 through 8 are diagrams illustrating a control process using received accumulated driving information according to exemplary embodiments.

Referring to FIG .6, the process of controlling the vehicle 10 is illustrated in which the number of times the speed limit is exceeded occurs more than a preset frequency. The user profile server 200 accumulates driving information and generates accumulated driving information. The preset event is set to be the number of speed violation (10 times) per driving time (100 hours). When the number of speed violations which is analyzed from accumulated driving information satisfies a preset event condition, the user profile server 200 transmits, to the service providing device 100, accumulated driving information including a driving pattern.

The service providing device 100 receives accumulated driving information including a driving pattern. From the accumulated driving information, driving hours (100 hours) and the number of speed violation (10 times) are recognized. In other words, a preset event of the user profile server 200 may be the same as a preset condition of the service providing device 100. The service providing device 100 determines a speed limit and transmits a command for speed limitation to the vehicle 10. Using map information, the maximum speed information of the current road is found, a speed limit is set to the found maximum speed, and a command for restriction of speed to the speed limit may be transmitted. The vehicle 10 which receives a command may limit the maximum speed in response to the received speed limit command. As an example, speed limit may be controlled to maintain specific speed as the cruise control method. Alternatively, it may be controlled sot that a sensor (not shown) of the vehicle 10 measures speed and a carburetor is adjusted or otherwise restricted so that the vehicle may not operate over the transmitted speed limit.

Speed restriction of the vehicle 10 may be performed indirectly. In this indirect method, the terminal device 20 does not give a speed limit command to the vehicle 10, but gives a speed limit alarm to a user so that a user may reduce speed.

Referring to FIG. 7, when a preset frequency of calls occurs, controlling of the terminal device 20 is illustrated.

The user profile server 200 accumulates driving information and generates accumulated driving information. A preset event is set to be calling time of 1 hour per driving distance of 100 km. When a calling time analyzed from accumulated driving information satisfies a condition of a preset condition, the user profile server 200 transmit to the service providing device 100 accumulated driving information including a driving pattern.

The service providing device 100 receives accumulated driving information including driving pattern. From accumulated driving information, driving distance (100 km) and calling time (1 hour) are recognized. The service providing device 100 determines a calling restriction and restricts the calling and the receiving of the terminal device 20. For example, the service providing device may set a mode to change to a speaker mode and automatically receive a call.

Referring to FIG. 8, illustrated is a process of controlling the service providing device 100 when a preset frequency of accidents happens in a slow speed section. The user profile server 200 accumulates driving information and generates accumulated driving information. A preset event is set to be the number of accidents (3 times) per slow speed section (50 km). When the number of accidents analyzed form the accumulated driving information satisfies a preset event occurrence condition, the user profile server 200 transmits to the service providing device 100 accumulated driving information including a driving pattern.

The service providing device 100 receives accumulated driving information including a driving pattern. It is recognized from accumulated driving information that the slow speed section (50 km) and the number of accidents (3 times) has occurred. The service providing device 100 determines execution of a detailed guide mode. When a vehicle enters a slower speed section, an alarm of a more intensified driving-related alarm may be provided along with a message indicating a safety driving alarm. For example, the slower speed section may include a back road section, construction section, section with serious curves, and child protection section. The intensified driving alarm may express more detailed map information or guide the driver to a change of lanes.

A preset event determined by the user profile server 200 and a preset condition which controls the vehicle 10 or the terminal device 20 by the service providing device 100 may be set in a diverse manner. In the above-described example, the preset event may be set to be an occurrence of speed that exceeds a preset speed and preset calling time, or the like. Alternatively, in the above example, the frequency is described, but absolute time, number, speed, and the like, may be included.

In addition, a preset event may include the number or time of a video playback of a preset frequency, the number of accidents over a preset time, the number or times of web access, the number of accidents over a preset frequency, sudden braking or acceleration over a preset number, and SMS sending/receiving over a preset number of times. When a corresponding event happens, the user profile server 200 transmits accumulated driving information to the service providing device 100. Accordingly, the above-described event may be set as a condition which is preset by the service providing device 100. In addition, when a preset condition is satisfied, the service providing device 100 may control the vehicle 10 or the terminal device 20 with limitation of video playback, limitation of web access, intensified driving-related alarm, limitation of SMS sending/receiving, and the like.

In addition, the service providing device 100 may divide steps and limit functions according to the steps. For example, the steps may be divided to a first step to perform all the functions, a second step to partially limit functions, and a third step to partially perform functions. In the first step, all of the functions of the terminal device 20 may be performed. In the second step, a function to display a UI of a complicated screen such as video and web access may be limited. In the third step, driving-related functions and functions related to calling and SMS sending/receiving may be performed. In this step, calling may be performed via a speaker phone only and SMS sending/receiving may be performed by voice interaction only. In the above steps, the limited functions are merely exemplary, and various methods may be included.

Setting of each step may be automatically performed by the service providing device 100. For example, when a preset event happens one time, or another number of times, the second step may be set, and when a preset event happens for three times, or another number of times, the third step may be set. Alternatively, whenever a preset event happens, functions related to the event may be limited only, and, for example when the number of events reaches five times or higher, all the functions may be restricted.

As described above, a control system including the service providing device 100 and the user profile server 200 may accumulate driving information and analyze a driving pattern, and control a terminal device or a vehicle to support safe operation suitable for each user.

As described above, the service providing device 100 may provide a safety driving service for a user who is determined as a driver of a vehicle. Hereinbelow, the operation of providing recommended contents for a user in a vehicle is described.

Figure 9:
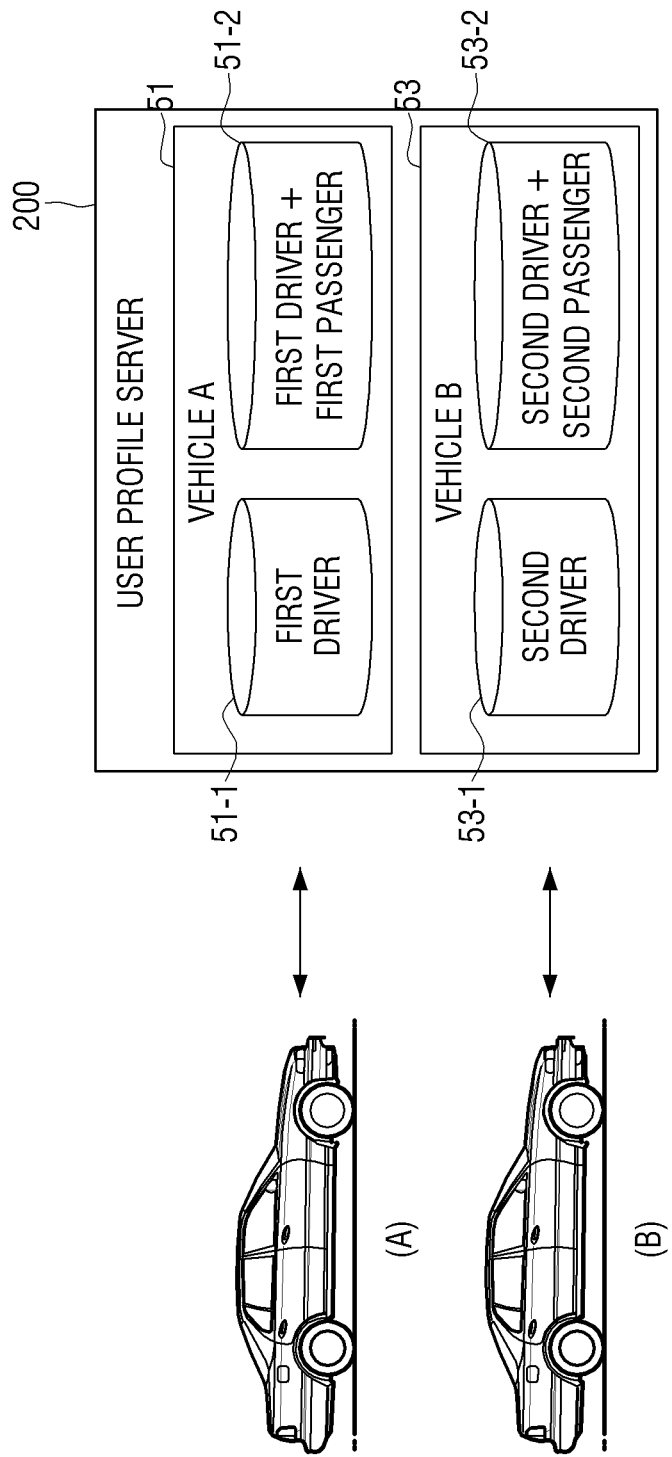
FIGS. 9 through 10 are diagrams illustrating providing contents recommendation information to a user in a vehicle according to an exemplary embodiment.
Figure 10:
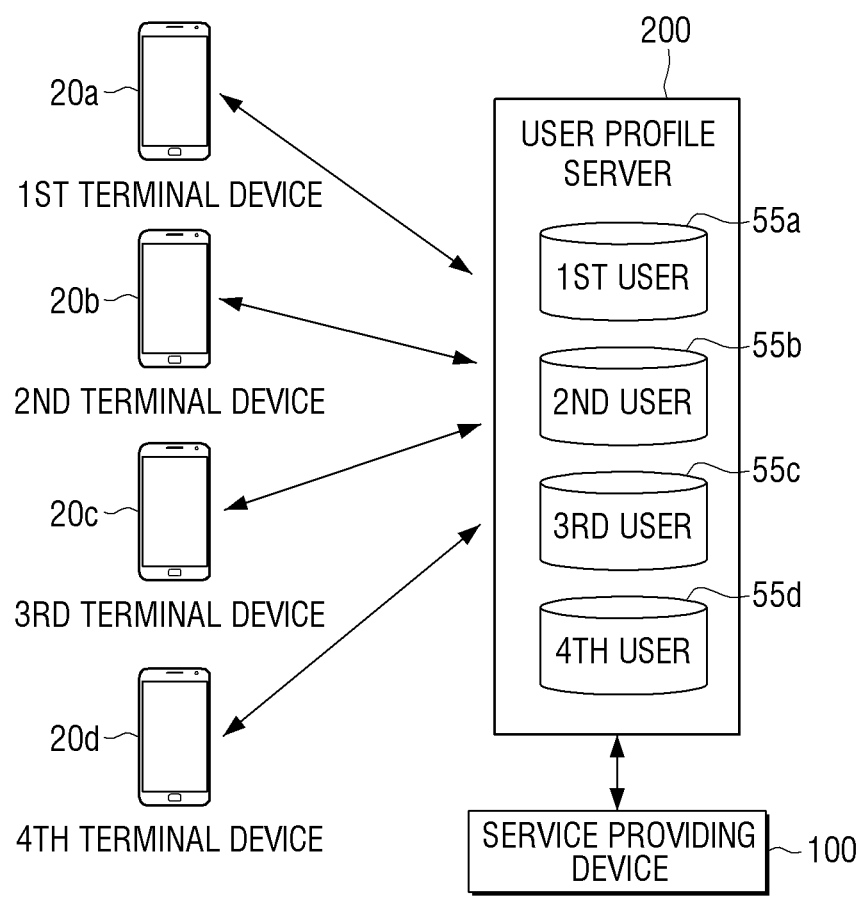

FIGS. 9-10 are exemplary views providing contents recommendation information to a user in a vehicle according to exemplary embodiments.

As described in FIG. 9, the user profile server 200 may group and store the first contents use information 51-1, when the first driver is in a vehicle A in a group 51 to which the vehicle A belongs, which provides contents for the first driver only. As another example, the user profile server 200 may group and store the second contents user information 51-2 which provides contents about when the first driver and the first passenger are in the vehicle. In addition, the user profile server 200 may group and store the third contents user information 53-1 which provides contents, when the second driver is in a vehicle B in a group 53 to which the vehicle B belongs, and the fourth contents use information 53-2 which provides contents, when the second driver and the second passenger are in the vehicle.

For example, when terminal information regarding the first driver is received from the service providing device 100 which is provided on the vehicle A, the user profile server 200 obtains the first contents use information on the first driver from among the first and second contents use information belonging to A group based on the received terminal information. Then, the user profile server 200 generates the contents recommendation information for the first driver from the first contents use information using the recommendation algorithm. Here, the recommendation algorithm, according to an exemplary embodiment, may be an algorithm to extract the contents which are mostly provided in a preset period.

Therefore, based on the recommendation algorithm, the user profile server 200 may extract the mostly provided contents during a preset period from the first contents use information and generate contents recommendation information related to the extracted contents.

As another example, when terminal information on the second driver and the second passenger is received from the service providing device 100 provided on a vehicle B, based on received terminal information, the user profile server 200 obtains the fourth contents use information 53-2 from among the third and fourth contents use information 53-1 and 53-2 belonging to a group 53 of vehicle B. Then, the user profile server 200 generates contents recommendation information for the second driver and the second passenger from the pre-obtained fourth contents use information 53-2 using the recommendation algorithm.

Here, the recommendation algorithm, according to an exemplary embodiment, may be algorithm to extract the mostly provided contents during a preset period. Accordingly, based on the recommendation algorithm, the user profile server 200 may extract the mostly provided contents during a preset period from the fourth contents use information 53-2, and generate contents recommendation information related to the extracted contents. That is, when the second driver and the second passenger are in a vehicle B, the user profile server 200 may generate the contents recommendation information for the mostly-provided contents.

According to another exemplary embodiment, the recommendation algorithm may be an algorithm to extract the mostly-provided contents during a preset period from among the contents provided to a user corresponding to a preset condition. For example, the second driver in a vehicle B may be a father, and the second passenger may be a son. In this case, based on the recommendation algorithm, the user profile server 200 may generate the contents recommendation information on the contents to be provided to the second passenger, that is, the son, from the fourth contents use information 53-2.

As another exemplary embodiment, the user profile server 200 may receive terminal information of user information of the first driver and terminal information of a new passenger (hereinafter, the third passenger) from the service providing device 100 of vehicle A. In this case, the user profile server 200 determines whether there is contents user information related to user information of the first driver and the third passenger from the first and second contents use information 51-1 and 51-2 belonging to group 51 of vehicle A. As a result, when it is determined that there is no contents use information related to the first driver and the third passenger, based on the recommendation algorithm, the user profile server 200 may generate contents recommendation information from the first contents use information 51-1 on the first driver.

As still another example, the user profile server 200 may receive terminal information of the first driver and the second driver from the service providing device 100 of vehicle A. In this example, the user profile server 200 respectively obtains the first contents use information 51-1 of the first driver belonging to a group 51 of vehicle A and the third contents use information 53-1 of the second driver belonging to a group 53 of vehicle B. Then, based on the recommendation algorithm, the user profile server 200 may generate contents recommendation information from the first contents use information 51-1 and the third contents use information 53-1.

According to the various exemplary embodiments, when contents recommendation information regarding a user in the vehicle 10 is generated, the user profile server 200 transmits contents recommendation information to the vehicle. Therefore, the outputter of the service providing device 100 may output the contents related to the contents recommendation information received from the user profile server 200 according to a control command of the controller. Here, the contents recommendation information may be tagging information to tag a recommended content or the recommendation contents to be provided to a user.

For example, when contents recommendation information are the recommendation contents to be provided to a user in the vehicle 10, the controller may control the ouputter to output the recommended contents received from the user profile server 200. Meanwhile, if the contents recommendation information is the tagging information to tag the recommended contents, the controller extracts a contents recommendation list related to received tagging information and displays it on a screen. Accordingly, a user in the vehicle 10 selects at least one contents with reference to the contents recommendation list which is displayed on the screen. When the user command is input through an inputter, the controller may extract contents which corresponds to a user command input from the inputter and output the contents through the outputter.

In some cases, the user profile server 200 may transmit contents recommendation information to a separate contents server. The contents server may search for the recommended contents which correspond to received contents recommendation information, and transmit the searched contents to the service providing device 100. The service providing device 100 may receive the recommended contents from a server and output the contents.

The service providing device 100 according to the present disclosure may provide a recommended content for a user riding in the vehicle 10. To be specific, the storage of the service providing device 100 may record and store contents use information which provide contents to at least one use riding in the vehicle 10. Therefore, based on the contents use information stored in the storage, the controller may control the outputter to provide at least one of the contents provided to a user riding in the vehicle 10. In this case, the storage may store contents use information in accordance with a combination of a user riding in the vehicle 10.

For example, when a driver only rides in the vehicle 10, the storage may store the first contents use information related to the contents provided for a driver. When a driver and the first passenger ride in the vehicle 10, the storage may store the second contents use information related to the contents provided for the driver and the first passenger. Meanwhile, the controller may determine that the first terminal device from among the first to third terminal devices adjacent to the vehicle 10 is located within a preset distance. Here, the first terminal device may be a terminal device of a driver of the vehicle 10. In this case, the controller may obtain the first contents user information according to user information included in terminal information received from the first terminal device. When the first contents use information is obtained, as described above, the controller determines the recommendation contents to be provided to a driver from the first contents use information based on the above-mentioned recommendation algorithm. Then, by determining whether the determined recommendation contents are stored in the storage, if the contents are stored, the controller controls the outputter to output the recommended contents. If the recommended contents are not stored in the storage, the controller may receive the recommended contents from the user profile server 200 through the communicator and control the outputter to output the received recommended contents. In addition, when the recommended contents are not stored in the storage, the controller may store a recommended contents list related to the recommended contents from among the stored contents and control the outputter to output the contents on a screen. Then, in relation to the recommended contents list which is output on a screen through the inputter, when a user command is input related to at least one contents, the controller may control the outputter to output a contents corresponding to a user command from among a plurality of contents stored in the storage.

As such, according to one or more exemplary embodiments, the service providing device 100 may recommend and provide the contents which are most suitable to a user riding in the vehicle 10. Until now, the configurations of the service providing device 100 which provide contents in consideration of users in the vehicle 10 have been explained. Meanwhile, the user profile server 200 may generate contents recommendation information based solely on terminal information.

As illustrated in FIG. 10, the user profile server 200 receives terminal information from a plurality of terminal devices 20*a*, 20*b*, 20*c*, and 20*d*. The terminal information includes user information of a user of the terminal device 20. The user profile server 200 receives user information and generates a corresponding user profile. In other words, the user profile server 200 generates the first user profile 55*a* corresponding to the first terminal device 20*a*, the second user profile 55*b* corresponding to the second terminal device 20*b*, the third user profile 55*c* corresponding to the third terminal device 20*c*, and the fourth user profile 55*d* corresponding to the fourth terminal device 20*d*.

Then, the user profile server 200 receives terminal information related to contents use from each terminal device. For example, the receiving of terminal information by the user profile server 200 may be performed on a periodic manner, whenever contents are played in the terminal device 20, and the like. In other words, the user profile server 200 receives contents information from the first terminal device 20*a* and stores in the first user profile 55*a*. In the same manner, contents information played in the second, third, and fourth terminal devices 20*b*, 20*c*, and 20*d* are received and stored in the second, third, and fourth user profiles 55*b*, 55*c*, and 55*d*. The process in which the user profile server 200 receives terminal information including play contents information from the terminal devices 20*a*, 20*b*, 20*c*, and 20*d*, and stores the user profiles 55*a*, 55*b*, 55*c*, and 55*d* may be performed regardless of users riding in the vehicle.

When a user rides in the vehicle, the service providing device 100 receives terminal information from a terminal device of a user riding in the vehicle. For example, when the first and second users ride in the vehicle, the service providing device 100 receives terminal information including user information from the first and second terminal devices 20*a* and 20*b*. The service providing device 100 transmits to the user profile server 200 received terminal information and contents recommendation request.

As illustrated in FIG. 9, by using a preset algorithm from terminal information related to the contents stored in the first and second user profiles 55*a*, 55*b*, the user profile server 200 generates the contents recommendation information. The user profile server 200 transmits contents recommendation information to the service providing device 100, and the service providing device 100 outputs recommended contents based on the contents recommendation information. The recommended contents may be the contents stored in the service providing device 100, received from the first and second terminal devices 20*a*, 20*b*, or received from a separate contents server.

Alternatively, the user profile server 200 may transmit contents recommendation information to a separate contents server, search for recommended contents by a contents server, and transmit the contents to the service providing device 100.

Meanwhile, in response to receiving a plurality of contents recommendation information on a plurality of users, the service providing device 100 may output recommended contents based on contents recommendation information which is common to a plurality of users. For example, the service providing device 100 may receive A, B, and C contents with respect to the first user, and B, C, and D, contents with respect to the second user from the user profile server 200. In this case, the service providing device 100 may output B and C contents which are commonly recommended for the first and second users in common. By outputting B and C contents list, the service providing device 100 may provide a user with an opportunity to select contents or arbitrarily output one content from among B and C contents.

As another exemplary embodiment, in response to receiving a plurality of contents recommendation information of a plurality of users, the service providing device 100 may output recommended contents based on contents recommendation information which corresponds to a user with the top priority. For example, when the third and fourth users ride in the vehicle, the service providing device 100 may receive the E and F contents with respect to the third user and the F and G contents with respect to the fourth user from the user profile server 200. When the third user is set to be the user of top priority, the service providing device 100 may output E and F contents. The top priority user may be set as a driver or may be set by a user's selection.

Until so far, a process of providing a recommended contents providing service to a user by the service providing device 100 has been described. As described above, the service providing device 100 may be connected with the electronic control unit 10 of the vehicle using a controller area network (CAN) and may be used to receive driving information. The CAN is described hereinbelow.

Figure 11:
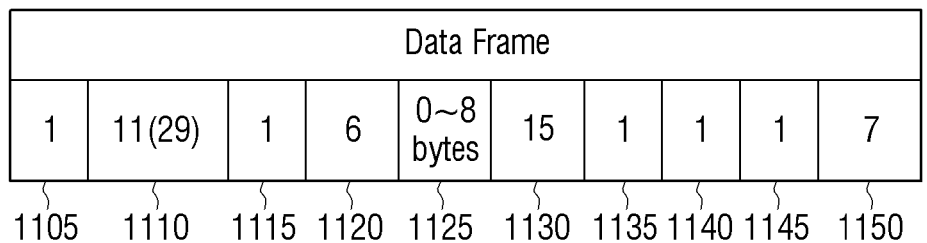
FIG. 11 is a view illustrating a data frame format of a controller area network (CAN) according to an exemplary embodiment.

FIG. 11 illustrates a data frame format of a controller area network (CAN) according to an exemplary embodiment.

The CAN indicates a network system for a vehicle that is used to provide digital serial communication between diverse measuring control devices of a vehicle. Complex electric wiring and relay of electronic components in a vehicle are replaced with a serial communication line so that weight and complexity of the vehicle can be reduced. In addition, presence or absence of abnormality caused by electronic interference can be diagnosed.

The CAN is a standard of a multi-master broadcast serial bus to connect the electronic control unit (ECU). Each node may transfer or receive a message, but each node may transfer or receive a message at the same time. A message includes an identification (ID) for indicating a priority order of the message of up to 8 bytes. Devices which are connected to the CAN are generally sensors, actuators, and other control devices. Such devices are not directly connected to a bus, but are connected through a host processor and a CAN controller.

A CAN protocol includes a physical layer, a transfer layer, an object layer, and an application layer, as in other network protocols. The CAN may be set in two different message (or frame) formats. A general frame supports 11 bits of identifiers, and an extension frame supports 29 bits of identifiers.

With reference to FIG. 11, a CAN data frame format includes 1 bit start frame field 1105, 11 bits or 29 bits identifier field 1110, 1 bit remote transmission request (RTR) field 1115, 6 bits control field 1120, 0 to 8 bytes data field 1125, 15 bits cyclic redundancy checking (CRC) field 1130, 1 bit CRC delimiter field 1135, 1 bit acknowledgement (ACK) slot 1140, 1 bit ACK delimiter field 1145, and 7 bits end of frame field 1150.

The start of frame field 1105 indicates a start of a transferred frame. The identifier field 1110 is for data representing a message priority order. When two nodes transfer a message at the same time, the order is determined according to a priority order of the identifier field 1110. When the RTR field 1115 is set to 0, a data frame is dominant, and when the RTR field 1115 is set to 1, a remote frame is recessive. The remote frame is a frame which is output when a receiver requests data from a transmitter.

The control field 1120 includes a 1 bit identifier extension bit (IDE) field, 1 bit reserved bit field, and 4 bits of a data length code field. The data field 1125 contains data to transfer. The CRC field 1130 checks an error by separating a predetermined section of bits. If the ACK slot 1340 is set to 1, the transmitter transmits a recessive state.

The CRC delimiter field 1135, the ACK delimiter field 1145, and the end of frame field 1150 become 1 in the recessive state.

As described above, communications in the ECU are enabled using the CAN, and state information of the vehicle may be transferred to the service providing device 100, such as the head unit of the vehicle.

Until so far, a process of providing a recommended contents service and safety driving service by the service providing device 100 has been described. Hereinbelow, the operations of the service providing device 100 are described with a timing diagram.

Figure 12:
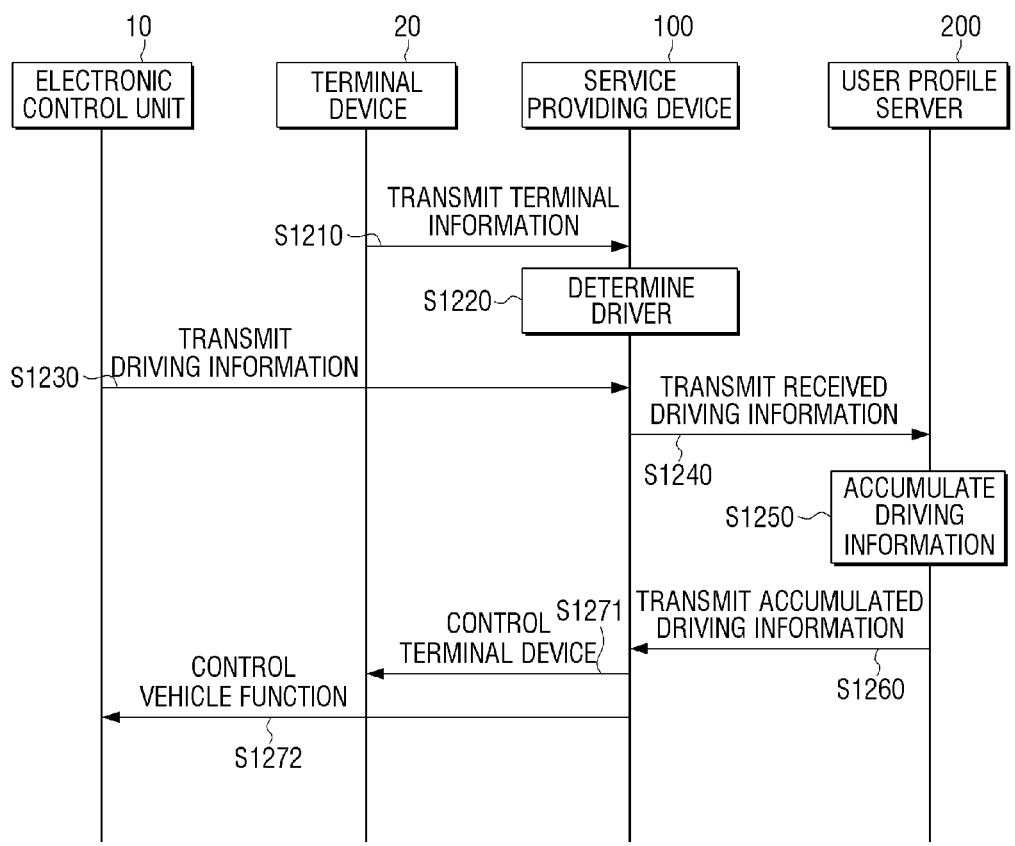
FIG. 12 is a sequence diagram illustrating a process for providing a safety driving service according to an exemplary embodiment.

FIG. 12 is a sequence diagram illustrating a process for providing safety driving service according to an exemplary embodiment.

Referring to FIG. 12, the terminal device 20 transmits to the service providing device 100 a terminal signal including terminal information (S1210). The service providing device 100 determines a driver using the received terminal information (S1220). Here, the terminal information indicates an identification number and location information of the terminal device 20, or the like. The service providing device 100 determines the terminal device 20 which is located within a preset distance, and determines a user riding in a vehicle based on a terminal signal including the received terminal information from the terminal device 20 within a preset distance. In the present disclosure, it is assumed that each user individually owns the terminal device 20. Therefore, a user is considered the same as the terminal device 20.

As an example, a method for determining a driver by the service providing device 100 may include determining the terminal device 20 which matches prestored terminal information in the service providing device 100 as a driver. Alternatively, the service providing device 100 may determine the terminal device 20 in a driver's seat as a driver by using location information included in the received terminal information. In some cases, the service providing device 100 may determine a driver using direction or size of a terminal signal received from the terminal device 20.

The electronic control unit 10 transmits driving information to the service providing device 100 (S1230). When a driver is determined, the service providing device 100 receives driving information from the electronic control unit 10. In some cases, the service providing device 100 may internally detect some driving information.

The service providing device 100 transmits, to the user profile server 200, received driving information (S1240). The user profile server 200 generates a corresponding user profile and accumulates received driving information (S1250).

When a preset event happens, the user profile server 200 transmits accumulated driving information to the service providing device 100 (S1260). The service providing device 100 controls the terminal device 20 (S1271) or the electronic control unit 10 (S1272).

Figure 13:
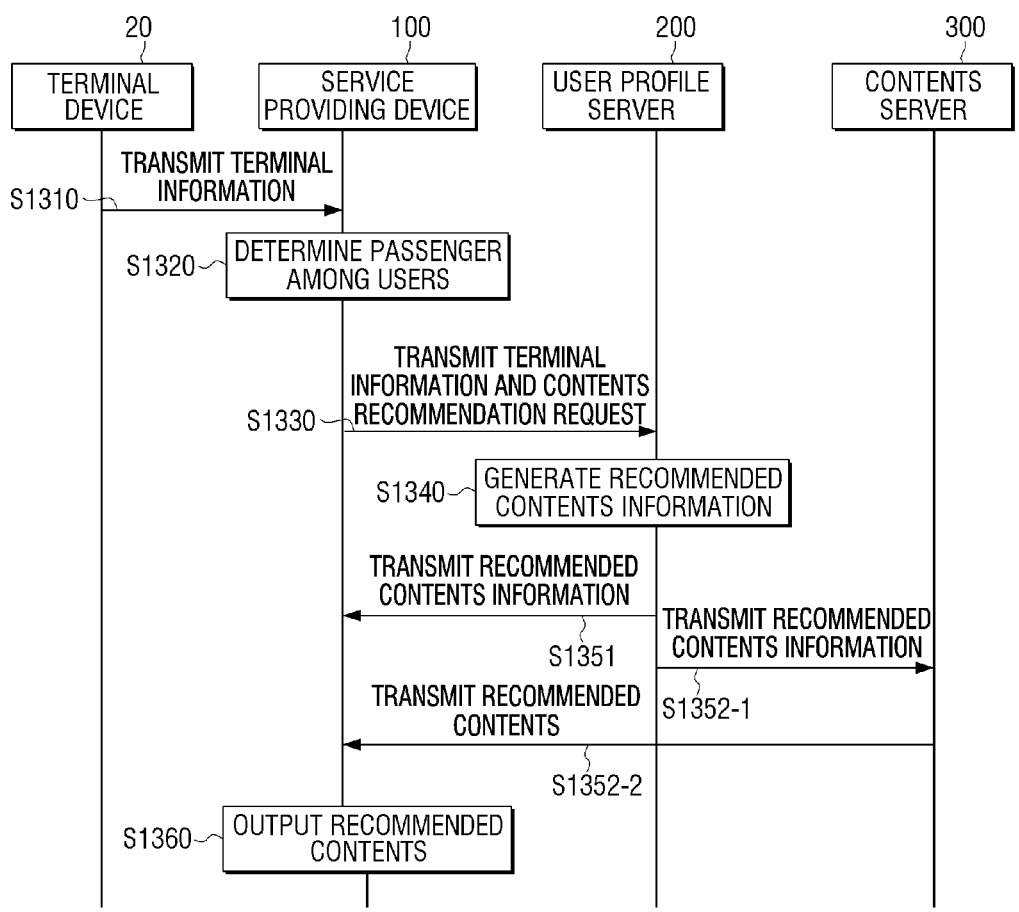
FIG. 13 is a sequence diagram illustrating a process for providing contents according to an exemplary embodiment.

FIG. 13 is a sequence diagram illustrating a process for providing contents according to an exemplary embodiment.

The user profile server 200 may receive contents playback-related information from the terminal device 20 and store the contents in a user profile. Alternatively, when a user rides in a vehicle, the user profile server 200 may receive, from the service providing device 100, terminal information of the terminal device 20 of a user riding in a vehicle and information related to playback of contents, and store them in a corresponding profile.

Referring to FIG. 13, the terminal device 20 transmits a terminal signal including terminal information to the service providing device 100 (S1310). The service providing device 100 determines whether a user rides in a vehicle, the number of users riding in a vehicle, and whether a user is a driver or not, using the terminal signal.

The service providing device 100 determines whether or not a passenger is included from among users riding in a vehicle (S1320). When it is determined that a passenger is included, the service providing device 100 provides a recommended contents service.

The service providing device 100 transmits terminal information and contents recommendation request (S1330) to the user profile server 200. The user profile server 200 generates contents recommendation information (S1340). Using information related to contents playback stored in a profile, the user profile server 200 generates contents recommendation information. The contents recommendation information may be generated in a unit of a vehicle or a unit of a user. In addition, the contents recommendation information may be information about one content or a plurality of contents.

The user profile server 200 transmits the generated contents recommendation information to the service providing device 100 (S1351).

Alternatively, the user profile server 200 transmits, to a contents server 300, the generated contents recommendation information (S1352-1) the contents server 300 searches for recommended contents using received contents recommendation information, and transmits the searched recommendation contents to the service providing device 100 (S1352-2).

The service providing device 100 outputs recommended contents (S1360). When the service providing device 100 receives contents recommendation information from the user profile server 200, the service providing device 100 may output the contents corresponding to contents recommendation information from among stored contents. Alternatively, the service providing device 100 may receive, from the terminal device 20, recommended contents and output the contents, or receive the contents from the contents server 300 and output the contents.

When the service providing device 100 receives recommended contents from the contents server 300, received recommended contents are output.

As described above, according to the exemplary embodiment, the service providing device 100 may recommend and provide contents most suitable to a user riding in the vehicle 10. Hereinbelow, a method for providing a service by the service providing device 100 is described.

Figure 14:
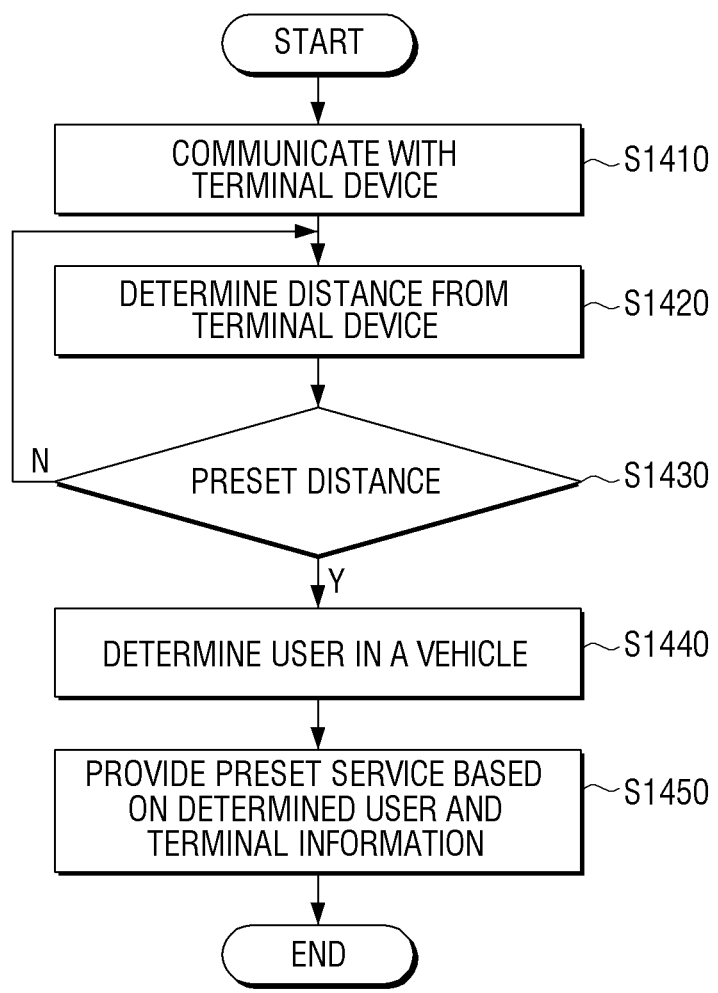
FIG. 14 is a flow chart illustrating a method for providing a service according to an exemplary embodiment.

FIG. 14 is a flow chart illustrating a method for providing a service according to an exemplary embodiment.

As illustrated in FIG. 14, the service providing device 100 communicates with at least one terminal device 20 and determines a distance of the at least one terminal device 200 (S 1410 and S 1420). Here, the service providing device 100 is a device which is provided on the vehicle 10, which performs navigation and contents playback, and which is capable of wireless communication. The service providing device 100 may perform communication with all the terminal devices nearby, through near field wireless communication. To be specific, around the vehicle 10, the first to third terminal devices may be located. Accordingly, the service providing device 100 may communicate with the first to third terminal devices and receive a terminal signal including terminal information from the first to third terminal devices. Here, the terminal information may include location information of each of the first to third terminal devices and identification information.

According to an exemplary embodiment, power for the service providing device 100 provided in the vehicle 10 may be supplied when a driver having a smart key is located within a preset threshold range or in accordance with a control command by a driver. According to this event, when operation of the service providing device 100 resumes, the service providing device 100 may request terminal information to the first to third terminal devices nearby, and receive terminal information. According to another exemplary embodiment, after operation is resumed, the service providing device 100 may request terminal information to nearby first to third terminal devices and request terminal information.

As described above, when terminal information of the first to third terminal devices is received, based on preset threshold distance information and location information included in terminal information of each of the first to third terminal devices, the service providing device 100 may determine whether the first to third terminal devices are located within a preset distance. To be specific, the service providing device 100 periodically collects and stores location information of the vehicle 10. Then, when terminal information is received from each of the first to third terminal devices, the service providing device compares location information which is most recently stored and location information included in terminal information received from each of the first to third terminal devices, and determines which terminal device from among the first to third terminal devices is within a preset distance. In some cases, the service providing device 100 transmits to the terminal device 20 a signal and receives from the terminal device 20 a response signal. The service providing device 100 may determine a distance to the terminal device 20 using a response time which indicates an amount of time until receiving a response signal. As such, the service providing device 100 determines a distance with a terminal device 20 by communicating with the terminal device 20. The service providing device 100 determines whether the terminal device 20 is within a preset distance based on determined distance (S1430). Then, the service providing device 100 determines a user riding in the vehicle 10 based on the determination results and provides a preset service based on the determined user and terminal information (S1440 and S1450). The service providing device 100 provides a safety driving service for a user who is determined as a driver, and when it is determined that a passenger is included in the users riding in a vehicle, provides a recommendation contents service.

According to the various exemplary embodiments, a service providing device may support safety driving that is suitable for a driving pattern of a driver and provide contents based on a preference of all the users riding a vehicle.

A method for providing a service according to the above-described various exemplary embodiments may be implemented as a program and provided to a service providing device.

As an example, a non-transitory computer readable medium in which a program which executes the steps of receiving a terminal signal from at least one terminal device, determining distance with a terminal device from received terminal signal, determining a user riding in a vehicle based on determined distance, and providing a preset service based on the determined user and terminal information included in a terminal signal are stored may be provided.

For example, a program capable of communicating with a mobile device, acquiring a keyword from a call conversation if the mobile device makes a call, and displaying additional information corresponding to the keyword may be stored in a non-transitory computer readable medium.

A non-transitory computer readable medium is a medium which does not store data temporarily such as a register, cache, and memory but stores data semi-permanently or permanently and is readable by devices. More specifically, the aforementioned diverse applications or programs may be stored and provided in a non-transitory computer readable medium such as a compact disk (CD), digital video disk (DVD), hard disk, Blu-ray disk, universal serial bus (USB), memory card, and read-only memory (ROM).

The foregoing exemplary embodiments and advantages are merely exemplary and are not to be construed as limiting the present invention. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A service providing apparatus included in a vehicle, the service providing apparatus comprising:
   a communicator configured to receive a terminal signal from a terminal apparatus; and
   a controller configured to determine a user corresponding to the terminal apparatus and a distance between the service providing apparatus and the terminal apparatus, based on the received terminal signal, determine that the user is riding in the vehicle and whether the user is a driver of the vehicle or a passenger based on the determined distance, and provide a preset service based on the determined user and terminal information included in the received terminal signal.

2. The service providing apparatus of claim 1, wherein the controller is configured to determine that the user corresponding to the terminal is riding in the vehicle based on the terminal apparatus being located within a preset distance from the service providing apparatus, and the determining that the user is riding in the vehicle is based on the terminal signal received from the terminal apparatus.

3. The service providing apparatus of claim 1, wherein, in response to the user being determined as a driver of the vehicle, the communicator is configured to receive driving information from the vehicle and transmit, to a user profile server, the received driving information, and receive, from the user profile server, accumulated driving information based on a preset event, and
   the controller is configured to control at least one of the vehicle and the terminal apparatus in accordance with a preset condition based on the received accumulated driving information.

4. The service providing apparatus of claim 1, further comprising:
   an outputter configured to output contents,
   wherein the communicator receives a plurality of terminal signals of a plurality of terminal apparatuses corresponding to a plurality of users in the vehicle,
   wherein, in response to determining that at least one passenger is included among the plurality of users riding in the vehicle, the communicator is configured to transmit the terminal information and contents recommendation request to a user profile server, and receive contents recommendation information generated based on the terminal information, and
   wherein the controller is configured to control the outputter to output a recommended content based on the received contents recommendation information.

5. The service providing apparatus of claim 3, wherein, in response to receiving the accumulated driving information, the controller is configured to perform at least one of:
   restrict at least one of a calling function and a video playback function of the terminal apparatus,
   restrict a maximum speed of the vehicle, and
   provide a guiding detailed path.

6. The service providing apparatus of claim 3, wherein the preset event is based on at least one of a call, a video playback, a speed violation, a sudden braking, a sudden acceleration, and a number of accidents that exceeds a preset frequency.

7. The service providing apparatus of claim 4, wherein, in response to a plurality of contents recommendation information corresponding to the plurality of users being received, the controller is configured to control the outputter to output a recommended content based on contents recommendation information which is common to the plurality of users.

8. A user profile server comprising:
   a communicator configured to receive at least one of driving information of a vehicle and terminal information of a terminal apparatus in the vehicle from a service providing apparatus included in the vehicle based on whether a user is a driver of the vehicle or a passenger; and
   a controller configured to generate accumulated driving information by accumulating and analyzing the received driving information if the user is the driver of the vehicle, and generate contents recommendation information based on the received terminal information if the user is the passenger,
   wherein, in response to a preset event occurring with respect to the user who is determined to be the driver of the vehicle, the controller is configured to transmit the accumulated driving information including a driving pattern of the driver to the service providing apparatus included in the vehicle, and, in response to a contents recommendation request being received, the controller is configured to transmit the generated contents recommendation information to the service providing apparatus.

9. A service providing method of a service providing apparatus included in a vehicle, the method comprising:
   receiving a terminal signal from a terminal apparatus;
   determining a user corresponding to the terminal apparatus and a distance between the service providing apparatus and the terminal apparatus, based on the received terminal signal;
   determining that the user is riding in the vehicle and whether the user is a driver of the vehicle or a passenger based on the determined distance; and
   providing a preset service based on the determined user and terminal information included in the received terminal signal.

10. The method of claim 9, wherein the determining that the user corresponding to the terminal apparatus is riding in the vehicle comprises determining that the terminal apparatus is located within a preset distance from the service providing apparatus, and the determining that the user is riding in the vehicle is based on a terminal signal received from the terminal apparatus.

11. The method of claim 9, further comprising:
in response to the user being determined as a driver of the vehicle, receiving driving information from the vehicle and transmitting, to a user profile server, the received driving information; and
receiving, from the user profile server, accumulated driving information based on a preset event,
wherein the providing the preset service comprises controlling at least one of the vehicle and the terminal apparatus according to a preset condition based on the received accumulated driving information.

12. The method of claim 9, further comprising:
receiving a plurality of terminal signals of a plurality of terminal apparatuses corresponding to a plurality of users in a vehicle;
determining that at least one passenger is included among the plurality of users riding in the vehicle,
transmitting the terminal information and contents recommendation request to a user profile server; and
receiving contents recommendation information generated based on the terminal information,
wherein the providing the service comprises outputting a recommended content based on the received contents recommendation information.

13. The method of claim 11, wherein the providing the preset service comprises, in response to receiving the accumulated driving information, performing at least one of restricting a calling function of the terminal apparatus, restricting a video playback function of the terminal apparatus, restricting a maximum speed of the vehicle, and providing a guiding detailed path.

14. The method of claim 11, wherein the preset event is based on at least one of a call, a video playback, a speed violation, a sudden braking, a sudden acceleration, and a number of accidents that exceeds a preset frequency.

15. The method of claim 12, wherein, in response to a plurality of contents recommendation information corresponding to the plurality of users being received, outputting a recommended content based on contents recommendation information which is common to the plurality of users.

16. A mobile terminal comprising:
a communicator configured to transmit position information indicating that the mobile terminal is located within a vehicle and identification information of the mobile terminal, to a service providing apparatus that is disposed within the vehicle and determines a user of the mobile terminal is riding in the vehicle if the mobile terminal is located within a preset distance from the service providing apparatus; and
a controller configured to restrict at least one function of the mobile terminal based on an instruction received by the communicator from the service providing apparatus, the received instruction being based upon at least one of movement information of the vehicle and content use information of the mobile terminal.

17. The mobile terminal of claim 16, wherein the received instruction used by the controller is based on the movement information of the vehicle comprising at least one of a number of speed limit violations over a predetermined time period, and an average speed of the vehicle over a predetermined time period.

18. The mobile terminal of claim 16, wherein the received instruction used by the controller is based on the movement information of the vehicle comprising at least one of an amount of usage of brakes of the vehicle, and an amount of accelerations of the vehicle.

19. The mobile terminal of claim 16, wherein the mobile terminal and the service providing apparatus are configured to connect to each other via at least one of a universal serial bus (USB) connection and a wireless connection.

20. The mobile terminal of claim 16, wherein the service providing apparatus is embedded within the vehicle.

* * * * *